US012764516B2

(12) United States Patent
Fu et al.

(10) Patent No.: US 12,764,516 B2
(45) Date of Patent: Oct. 13, 2026

(54) METHODS PROVIDING FLEXIBLE COMMUNICATION BETWEEN RADIO ACCESS AND CORE NETWORKS AND RELATED NODES

(71) Applicant: Telefonaktiebolaget LM Ericsson (publ), Stockholm (SE)

(72) Inventors: Zhang Fu, Stockholm (SE); Gunnar Mildh, Sollentuna (SE); Göran Rune, Linköping (SE); Paul Schliwa-Bertling, Ljungsbro (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 526 days.

(21) Appl. No.: 18/012,960

(22) PCT Filed: Jun. 25, 2020

(86) PCT No.: PCT/IB2020/056028
§ 371 (c)(1),
(2) Date: Dec. 26, 2022

(87) PCT Pub. No.: WO2021/260417
PCT Pub. Date: Dec. 30, 2021

(65) Prior Publication Data

US 2023/0254680 A1 Aug. 10, 2023

(51) Int. Cl.
*H04W 8/06* (2009.01)
*H04W 8/18* (2009.01)
*H04W 36/14* (2009.01)

(52) U.S. Cl.
CPC ............ *H04W 8/065* (2013.01); *H04W 8/18* (2013.01); *H04W 36/1446* (2023.05)

(58) Field of Classification Search
CPC ... H04W 8/065; H04W 8/18; H04W 36/1446; H04W 36/02; H04W 76/11; H04W 48/16; H04W 36/0016; H04W 48/08
See application file for complete search history.

(56) References Cited

U.S. PATENT DOCUMENTS

2018/0317157 A1 11/2018 Baek et al.
2019/0124572 A1 4/2019 Park et al.
(Continued)

FOREIGN PATENT DOCUMENTS

CN 109392043 A 2/2019
CN 109526252 A 3/2019
(Continued)

OTHER PUBLICATIONS

International Search Report and Written Opinion of the International Searching Authority, PCT/IB2020/056028, mailed Apr. 26, 2021, 19 pages.
(Continued)

*Primary Examiner* — Marcos L Torres
(74) *Attorney, Agent, or Firm* — Sage Patent Group

(57) ABSTRACT

Methods of operating a network function NF node of a communication network are discussed. In such methods a message is received from an access and mobility management function AMF node. Moreover, the message includes information regarding a radio access network RAN node with respect to a communication device. Related methods of operating RAN nodes and AMF nodes are also discussed.

19 Claims, 20 Drawing Sheets

(56) References Cited

U.S. PATENT DOCUMENTS

| | | | | |
|---|---|---|---|---|
| 2019/0191467 | A1 * | 6/2019 | Dao | H04W 76/11 |
| 2020/0100101 | A1 | 3/2020 | Torvinen et al. | |
| 2020/0120570 | A1 | 4/2020 | Youn et al. | |

FOREIGN PATENT DOCUMENTS

| | | | |
|---|---|---|---|
| CN | 110447249 | A | 11/2019 |
| CN | 111133732 | A | 5/2020 |
| EP | 3496465 | A1 | 6/2019 |
| WO | WO 2019/031941 | A1 | 2/2019 |

OTHER PUBLICATIONS

Ravishankar, R., et al., "Deploying ICN in 3GPP's 5G NextGen Core Architecture," 2018 IEEE 5G World Forum (5GWF), IEEE Jul. 9, 2018 (XP033432793) _ pages.

3rd Generation Partnership Project; Technical Specification Group Services and System Aspects; Procedures for the 5G System (5GS); Stage 2 (Release 16) 3GPP TS 23.502 V16.4.0 (Mar. 2020) 582 pages.

3rd Generation Partnership Project; Technical Specification Group Services and System Aspects; System architecture for the 5G System (5GS); Stage 2 (Release 16) 3GPP TS 23.501 V16.4.0 (Mar. 2020) 430 pages.

Office Action, Chinese Patent Application No. 202080103104.9, mailed Nov. 20, 2024, 26 pages.

CATT, Ericsson, "AMF forwarding Location services messages beween UE and LMF," C4-195435, 3GPP TSG-CT WG4 Meeting #95, Reno, US; Nov. 11-15, 2019, 43 pages.

Yang Li, Li Dapeng, "Realization and Trend of Network Slicing in 5G NG-RAN," ZTE Corporation, Shenzhen 518057, China) ZTE Technology Journal, Dec. 2019, vol. 25 No. 6, pp. 8-18.

* cited by examiner

METHODS PROVIDING FLEXIBLE COMMUNICATION BETWEEN RADIO ACCESS AND CORE NETWORKS AND RELATED NODES

CROSS REFERENCE TO RELATED APPLICATIONS

This application is a 35 U.S.C. § 371 national stage application of PCT International Application No. PCT/IB2020/056028 filed on Jun. 25, 2020, the disclosure and content of which is incorporated by reference herein in its entirety.

TECHNICAL FIELD

The present disclosure relates generally to communications, and more particularly to communication methods and related devices and nodes supporting wireless communications.

BACKGROUND

An overview of SBA (Service Based Architecture) is discussed below.

In the current 3GPP (3rd Generation Partnership Project) specification for 5G (5th Generation) core network, 5G System architecture is defined to support data connectivity and services enabling deployments to use techniques such as, for example, Network Function Virtualization and Software Defined Networking. The 5G System architecture may leverage service-based interactions between Control Plane (CP) Network Functions (NFs) which are identified in reference [1]. FIG. 1 shows the basic Service Based Architecture (SBA) of the core network. Network Functions (NFs) expose their abilities as services that can be used by other NFs. For example, an Access and Mobility Management Function (AMF) can provide a service that enables an NF to communicate with the UE (User Equipment) and/or the Access Network (AN) through the AMF; and a Session Management Function (SMF) exposes a service that allows the consumer NFs to handle the Protocol Data Unit (PDU) sessions of UEs. FIG. 1 illustrates a 5th Generation Core 5GC Architecture (from Reference [1], 3GPP TS 23.501).

NFs expose themselves and their services by registering themselves in the NF Repository Function (NRF). The NRF also offers a service discovery service to enable NFs to find each other and their NF services.

In current standards, interaction between the radio access network and the core network are handled via the AMF.

SUMMARY

According to some embodiments of inventive concepts, methods of operating a network function NF node of a communication network are provided. In such methods receiving a message is received from an access and mobility management function AMF node, and the message includes information regarding a radio access network RAN node with respect to a communication device.

According to some other embodiments of inventive concepts, methods of operating a first radio access network RAN node of a communication network are provided. Communication information is received from a first network function NF node and from a second NF node. Moreover, the communication information from the first and second NF nodes is used to support communication for a communication device that is connected to the first RAN node. Responsive to initiating a handover of the communication device to a second RAN node, the communication information is transmitted to the second RAN node.

According to still other embodiments of inventive concepts, methods of operating a first radio access network RAN node of a communication network are provided to support handover of a communication device from a second RAN node to the first RAN node. Communication information is received from the second RAN node. The communication information is used to support communication for the communication device that is being handed over from the second RAN node to the first RAN node, and the communication information relates to a first network function NF node and to a second NF node. Communication with the first NF node is provided based on the communication information.

According to yet other embodiments of inventive concepts, methods of operating an access and mobility management function AMF node of a communication network are provided. A message is transmitted to a network function NF node. Moreover, the message includes information regarding a radio access network RAN node with respect to a communication device.

Some embodiments may support direct communication between nodes/elements/functions of the radio access network and NFs (e.g., core network, CN, NFs) other than the AMF. According to such embodiments, communication dependencies may be reduced, signaling latencies may be reduced, and/or AMF complexity may be reduced.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Figure 6:
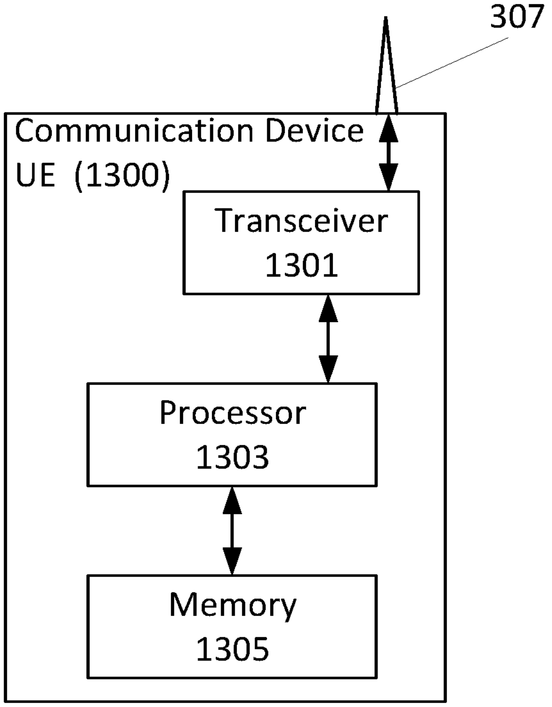
FIG. 6 is a block diagram illustrating a wireless device UE according to some embodiments of inventive concepts.

FIG. 6 is a block diagram illustrating elements of a communication device UE 1300 (also referred to as a mobile terminal, a mobile communication terminal, a wireless device, a wireless communication device, a wireless terminal, mobile device, a wireless communication terminal, user equipment, UE, a user equipment node/terminal/device, etc.) configured to provide wireless communication according to embodiments of inventive concepts. (Communication device 1300 may be provided, for example, as discussed below with respect to wireless device 4110 of FIG. 12.) As shown, communication device UE may include an antenna 1307 (e.g., corresponding to antenna 4111 of FIG. 12), and transceiver circuitry 1301 (also referred to as a transceiver, e.g., corresponding to interface 4114 of FIG. 12) including a transmitter and a receiver configured to provide uplink and downlink radio communications with a base station(s) (e.g., corresponding to network node 4160 of FIG. 12, also referred to as a RAN node) of a radio access network. Communication device UE may also include processing circuitry 1303 (also referred to as a processor, e.g., corresponding to processing circuitry 4120 of FIG. 12) coupled to the transceiver circuitry, and memory circuitry 1305 (also referred to as memory, e.g., corresponding to device readable medium 4130 of FIG. 12) coupled to the processing circuitry. The memory circuitry 1305 may include computer readable program code that when executed by the processing circuitry 1303 causes the processing circuitry to perform operations according to embodiments disclosed herein. According to other embodiments, processing circuitry 1303 may be defined to include memory so that separate memory circuitry is not required. Communication device UE may also include an interface (such as a user interface) coupled with processing circuitry 1303, and/or communication device UE may be incorporated in a vehicle.

As discussed herein, operations of communication device UE may be performed by processing circuitry 1303 and/or transceiver circuitry 1301. For example, processing circuitry 1303 may control transceiver circuitry 1301 to transmit communications through transceiver circuitry 1301 over a radio interface to a radio access network node (also referred to as a base station) and/or to receive communications through transceiver circuitry 1301 from a RAN node over a radio interface. Moreover, modules may be stored in memory circuitry 1305, and these modules may provide instructions so that when instructions of a module are executed by processing circuitry 1303, processing circuitry 1303 performs respective operations (e.g., operations discussed below with respect to Example Embodiments relating to wireless communication devices). According to some embodiments, a communication device UE 1300 and/or an element(s)/function(s) thereof may be embodied as a virtual node/nodes and/or a virtual machine/machines.

Figure 7:
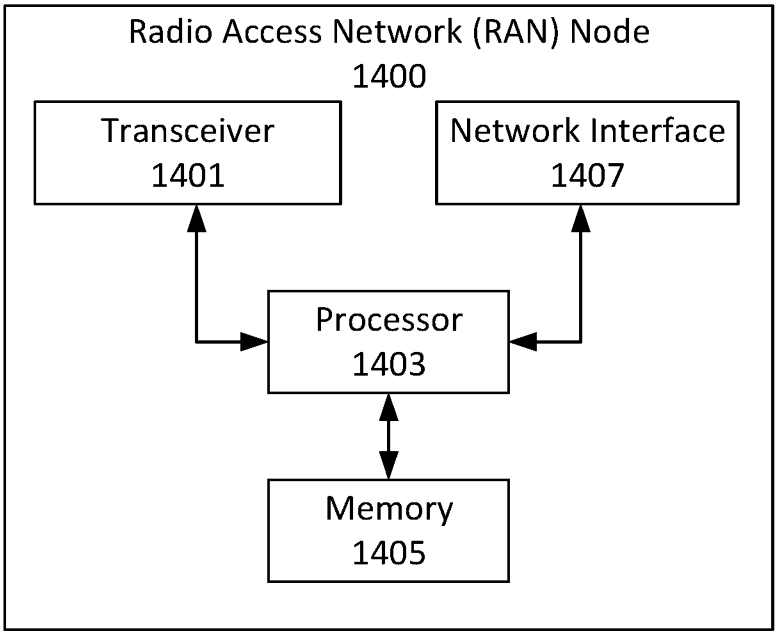
FIG. 7 is a block diagram illustrating a radio access network RAN node (e.g., a base station eNB/gNB) according to some embodiments of inventive concepts.

FIG. 7 is a block diagram illustrating elements of a radio access network RAN node 1400 (also referred to as a network node, base station, eNodeB/eNB, gNodeB/gNB, etc.) of a Radio Access Network (RAN) configured to provide cellular communication according to embodiments of inventive concepts. (RAN node 1400 may be provided, for example, as discussed below with respect to network node 4160 of FIG. 12.) As shown, the RAN node may include transceiver circuitry 1401 (also referred to as a transceiver, e.g., corresponding to portions of interface 4190 of FIG. 12) including a transmitter and a receiver configured to provide uplink and downlink radio communications with mobile terminals. The RAN node may include network interface circuitry 1407 (also referred to as a network interface, e.g., corresponding to portions of interface 4190 of FIG. 12) configured to provide communications with other nodes (e.g., with other base stations) of the RAN and/or core network CN. The network node may also include processing circuitry 1403 (also referred to as a processor, e.g., corresponding to processing circuitry 4170) coupled to the transceiver circuitry, and memory circuitry 1405 (also referred to as memory, e.g., corresponding to device readable medium 4180 of FIG. 12) coupled to the processing circuitry. The memory circuitry 1405 may include computer readable program code that when executed by the processing circuitry 1403 causes the processing circuitry to perform operations according to embodiments disclosed herein. According to other embodiments, processing circuitry 1403 may be defined to include memory so that separate memory circuitry is not required.

As discussed herein, operations of the RAN node may be performed by processing circuitry 1403, network interface 1407, and/or transceiver 1401. For example, processing circuitry 1403 may control transceiver 1401 to transmit downlink communications through transceiver 1401 over a radio interface to one or more mobile terminals UEs and/or to receive uplink communications through transceiver 1401 from one or more mobile terminals UEs over a radio interface. Similarly, processing circuitry 1403 may control network interface 1407 to transmit communications through network interface 1407 to one or more other network nodes (e.g., core network nodes and/or other RAN nodes) and/or to receive communications through network interface from one or more other network nodes (e.g., core network nodes and/or other RAN nodes). Moreover, modules may be stored in memory 1405, and these modules may provide instructions so that when instructions of a module are executed by processing circuitry 1403, processing circuitry 1403 performs respective operations (e.g., operations discussed below with respect to Example Embodiments relating to RAN nodes). According to some embodiments, RAN node 1400 and/or an element(s)/function(s) thereof may be embodied as a virtual node/nodes and/or a virtual machine/machines.

According to some other embodiments, a network node may be implemented as a core network CN node without a transceiver. In such embodiments, transmission to a wireless communication device UE may be initiated by the network node so that transmission to the wireless communication device UE is provided through a network node including a transceiver (e.g., through a base station or RAN node). According to embodiments where the network node is a RAN node including a transceiver, initiating transmission may include transmitting through the transceiver.

Figure 8:
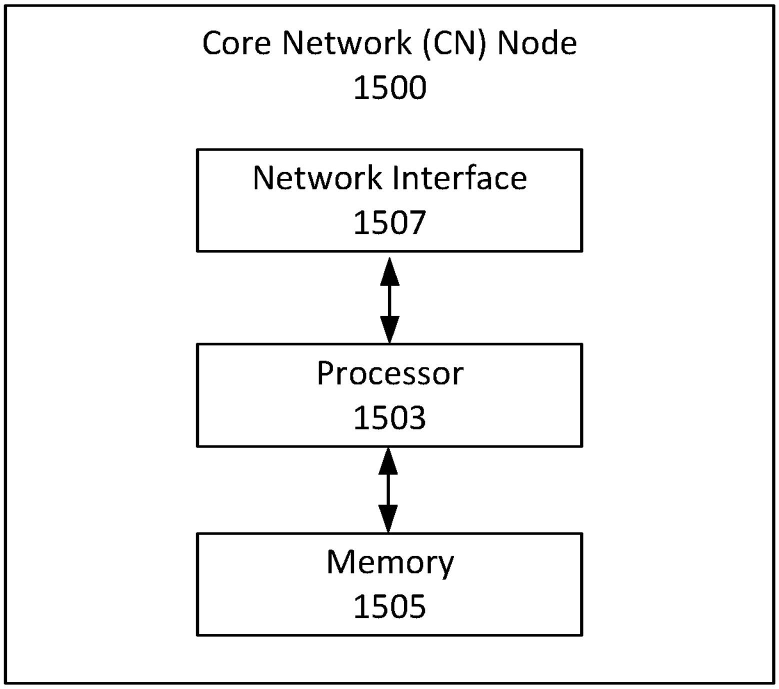
FIG. 8 is a block diagram illustrating a core network CN node (e.g., an AMF node, an NF node, an SMF node, a PCF node, a UDM node, a UPF node, etc.) according to some embodiments of inventive concepts.

FIG. 8 is a block diagram illustrating elements of a core network CN node (e.g., an NF node, an SMF node, an AMF node, etc.) of a communication network configured to provide cellular communication according to embodiments of inventive concepts. As shown, the CN node may include network interface circuitry 1507 (also referred to as a network interface) configured to provide communications with other nodes of the core network and/or the radio access network RAN. The CN node may also include processing circuitry 1503 (also referred to as a processor) coupled to the network interface circuitry, and memory circuitry 1505 (also referred to as memory) coupled to the processing circuitry. The memory circuitry 1505 may include computer readable program code that when executed by the processing circuitry 1503 causes the processing circuitry to perform operations according to embodiments disclosed herein. According to other embodiments, processing circuitry 1503 may be defined to include memory so that a separate memory circuitry is not required.

As discussed herein, operations of the CN node may be performed by processing circuitry 1503 and/or network interface circuitry 1507. For example, processing circuitry 1503 may control network interface circuitry 1507 to transmit communications through network interface circuitry 1507 to one or more other network nodes and/or to receive communications through network interface circuitry from one or more other network nodes. Moreover, modules may be stored in memory 1505, and these modules may provide instructions so that when instructions of a module are executed by processing circuitry 1503, processing circuitry 1503 performs respective operations (e.g., operations discussed below with respect to Example Embodiments relating to core network nodes). According to some embodiments, CN node 1500 and/or an element(s)/function(s) thereof may be embodied as a virtual node/nodes and/or a virtual machine/machines.

In the current specification, the interaction between Radio Access Network (RAN) nodes/functions and Core NFs goes through an AMF. For example, if the SMF has information about a PDU (Protocol Data Unit) session that it needs to send to the corresponding Radio Access Network (RAN) node (or RAN function), it will use an Namf_Communication_N1N2MessageTransfer service offered by the AMF. The AMF will forward the N2 SM information to the corresponding RAN node as set forth in reference [2] (3GPP TS 23.502). The reason for this is that only the AMF has established an interface connection to the RAN and knows the UE identifier in the RAN and in which RAN node the UE is at a given time.

Such communication dependencies may increase signaling latencies, and may also increase complexity of the AMF. Furthermore, the AMF may be impacted for every newly standardized interaction between RAN and CN NFs. This may violate a goal/principle of SBA that services should be independent.

According to some embodiments of inventive concepts, the core network functions NFs can communicate with RAN nodes without going through the AMF. To enable this, a new AMF service is proposed that provides RAN (Radio Access Network) node information for (or related to) specific UEs. NFs can query the AMF for RAN node information (if they don't have it and) if they want to communicate with the RAN node for a specific UE. Or, alternatively/complementary, the NFs can subscribe to notifications about changing RAN node information (e.g., due to mobility, change of UE state, change of UE configuration, etc.). According to some embodiments, the NFs can be CN NFs, and/or the NFs can be other NFs/entities/nodes in the network such as RAN functions/entities/nodes, Operation and Service management functions/entities/nodes, etc.

The RAN node information can contain information about which RAN node (or RAN Function) if any that currently serves the UE as well as information about the UE identifier (or UE identifiers) used in the RAN to identify a specific UE context. The RAN node information can also contain information about the UE state (e.g. IDLE, CONNECTED, etc.) which may make it possible for the CN (or other) functions receiving the RAN info to know if, when and how they can communicate with the RAN node.

In addition to the functionality above, the following supporting functionality is proposed. The RAN nodes can also maintain information of NFs in the CN (Core Network) and they can contact the NFs without going through the AMF. The information about which CN NFs that the RAN is interacting with for a specific UE, could be transferred between the RAN nodes at mobility in the UE context (e.g., over X2 or Xn interface, or via the CN using N2 or NG or S1 interface in a container). Similarly, the CN functions interacting directly with RAN can store the RAN node information and any UE identifiers that it receives from the AMF for future use (e.g., for subsequent communication needs). They could also transfer the information to other CN functions or other instances of the same CN function when required (e.g., when changing instance due to load balancing).

Note that mutual authentications/authorizations between RAN nodes and the NFs in the CN are not discussed further herein.

By allowing RAN nodes/functions to communicate directly with CN NFs other than the AMF, it may be possible for the RAN to utilize existing functions in the service-based CN such as a Network Repository Function to locate functions in the CN providing services to the RAN. Similar it may allow the CN NFs to directly interact with the RAN. For example, the Location Management Function (LMF) can request UE location information directly from the RAN, and/or the Network Data Analytics Function (NWDAF) can collect analytics data directly from the RAN services if desired. Additional benefits may include quicker standardization, reduced complexity, and/or reduced signaling.

Quicker standardization and/or implementation may be provided for new standardized or proprietary network features requiring RAN-CN interaction, since the functionality for CN NF functions to request the UE RAN information from the AMF can be reused as is when defining new functions requiring CN-RAN interaction.

Reduced complexity of the AMF may be provided, since new functions can be introduced without impacting the AMF (without requiring new AMF functionality to pass information to/from the RAN).

Potentially reduced signals for procedures may be provided since direct communication between CN and RAN nodes does not need to be passed via the AMF (and/or other CN functions). In this section, the proposed AMF service is discussed, and then, examples will be used to illustrate use of the new AMF service in the current 3gpp procedures. Examples include PDU session establishment procedures, paging procedures and handover procedures. In addition, explanation will be provided how NFs (e.g. the SMF) can contact the RAN directly and vice versa.

Generic services used to provide UE and RAN associations is discussed below.

Figure 1:
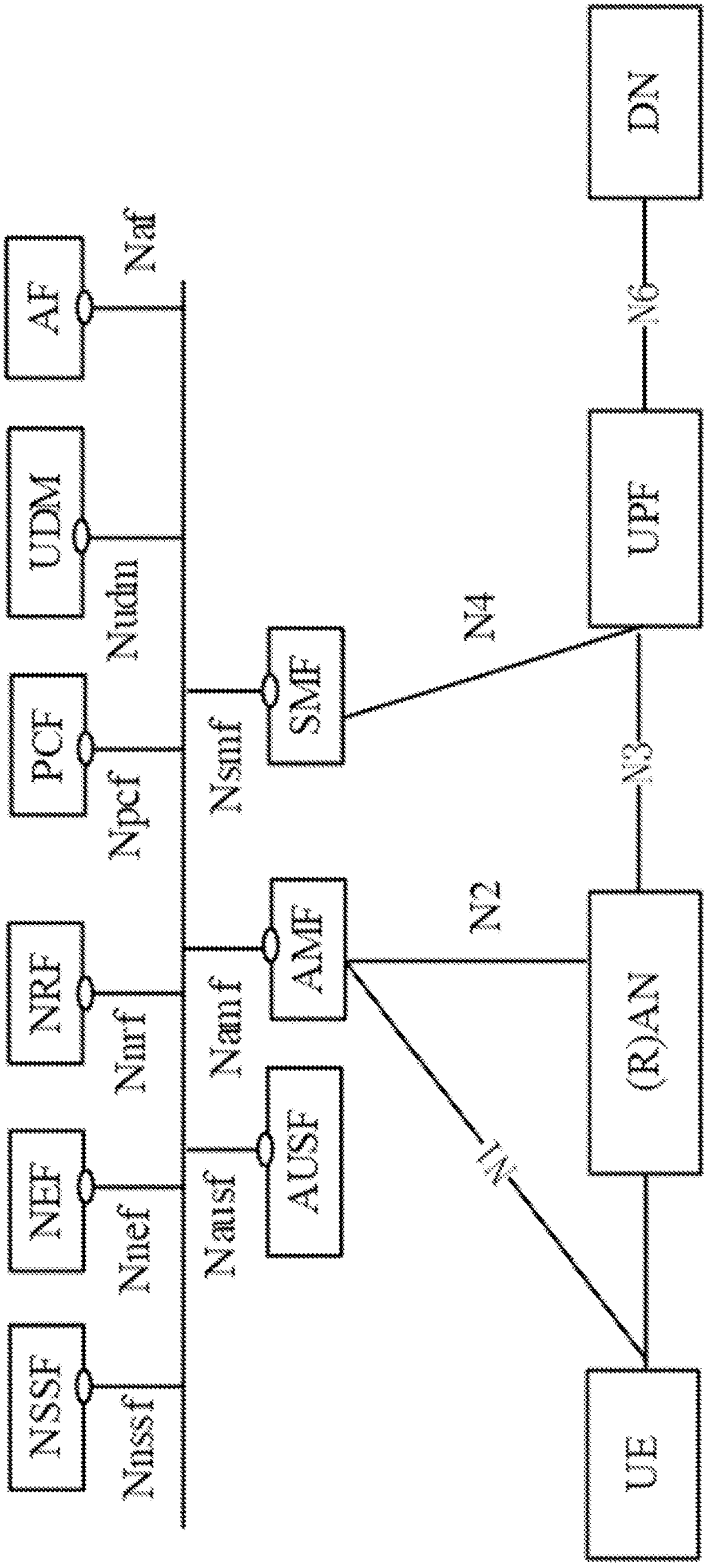
FIG. 1 is a block diagram illustrating a service based architecture SBA of a of the core network.
Figure 2:
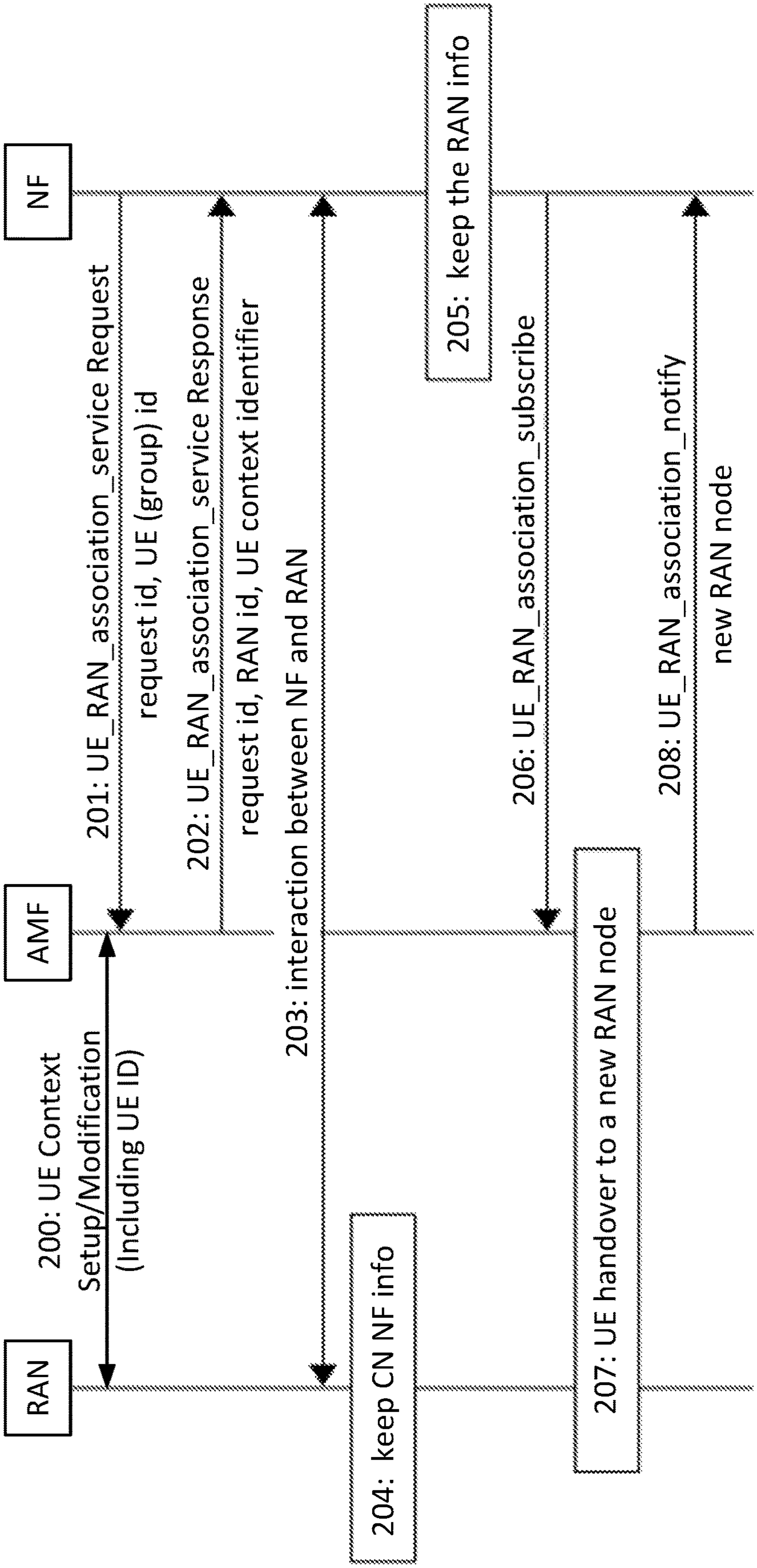
FIG. 2 is a message diagram illustrating RAN, AMF, and NF operations according to some embodiments of inventive concepts.

In the present disclosure, the AMF offers a new generic service (here denoted UE_RAN_association service) which can provide information regarding the RAN node which a specific UE is connected to. The service consumer could be any CN NF that wants to communicate with the RAN node. FIG. 2 is a message diagram illustrating operations according to some embodiments of inventive concepts.

At operation 200 of FIG. 2, a UE context setup and/or modification may be provided between RAN and AMF nodes, and during the UE context setup/modification, a UE identifier ID may be communicated between the RAN and AMF nodes.

When an NF wants to communicate with the RAN node that a specific UE (or a group of UEs) is connected to (e.g., it wants to send some information about a PDU session/sessions of the UE/UEs to that RAN node), the NF first sends a UE_RAN_association_service request message to the AMF, shown as operation 201 of FIG. 2. The UE_RAN_association_service_request message may include a request ID (an identifier for the UE_RAN_association_service_request message) and/or a UE ID (e.g., the UE_ID of operation 200). According to some embodiments, the UE ID may be a UE group ID for a group (plurality) of UEs. For example, the UE_RAN_association_service_request message may include an identifier ID of the UE, called UE ID, which could correspond to the full or parts of the SUPI (Subscription Permanent Identifier) of the UE (the ID could also be a group ID for a set of UEs) or the SUCI (Subscription Concealed Identifier) of the UE or any other identifier (e.g., IMSI, S-TMSI, NG or S1 related UE context identifier, etc.).

Then, if the UE is in connected mode, the AMF will return the ID of the RAN node to which the UE is connected using the UE_RAN_association_service response message at operation 202. The ID of the RAN node could be a URL, an IP address or some other type(s) of identifier(s) (such as a gNB ID). Once the NF receives the identifier of the RAN node at operation 202, the NF can interact with the RAN node directly without going through the AMF at operation 203.

The RAN node will keep/save the information of the CN NF at operation 204, and the CN NF will keep/save the information of the RAN node locally for later usage (at operation 205). The CN NF can also use UE_RAN_association_subscribe service message to subscribe to the AMF node for notifications in the event that the UE information changes as shown at operation 206. When the UE moves to another RAN node (i.e., in a handover) at operation 207, the AMF will thus use UE_RAN_association_notify message (based on the UE_RAN_association_subscribe message of operation 206) to send the information of the new RAN node to the CN NF, as shown at operation 208. The UE_RAN_association_notify message may also be referred to as a UE_RAN_association_notification message.

According to some embodiments, operations 201 and 206 may be combined. In such embodiments, the NF asks for the UE_RAN association information and at same time subscribes to receive notifications of changes. To achieve this, the NF can set a flag (or piggyback the notification subscription request) in the UE_RAN_association_service request message of operation 201 to indicate the request for subscription for the association changes, following with the parameters useful/needed for the subscription.

In the UE_RAN_association_service_request message of operation 201, the NF can also include the reason why it wants the UE_RAN association information (e.g., the NF wants to communicate the RAN node or the NF wants to do some statistics, etc.). The usage for the reason parameter is discussed below with respect to paging procedures.

Note that, when the UE switches to IDLE mode, the AMF could also use the UE_RAN_association_notify message to inform the corresponding NFs that the UE is now in IDLE mode. When the NFs receive this information, the NFs will know that they are not able to directly interact with the RAN without first triggering paging.

The AMF can provide (in the UE_RAN_association_service request message of operation 202 and/or the UE_RAN_association_notify message of operation 208) the NF with a UE context identifier which is associated with the RAN node serving the UE (here denoted RAN UE context identifier). The RAN UE context identifier could be used by the NF when performing signaling with the RAN node. The RAN UE context identifier could correspond to a temporary UE identifier assigned by the RAN or AMF. It also could include multiple temporary identifiers assigned by both the RAN and AMF. An alternative to using a temporary UE context identifier in the RAN is to use the UE SUPI also for the RAN signaling. A potential advantage of using a temporary UE context identifier is that it may reduce/avoid usage of a permanent identifier in the RAN which potentially is located in a less secure place than the core network and could be a less suitable place to handle privacy sensitive identifiers. Regardless of whether a temporary or permanent UE context identifier is used to identify the UE context in the RAN, there may be a need to signal this identifier between the RAN node (or function) and the AMF. Depending on which node allocates the identifier it could either be that identifier (or parts of it) is/are signaled from the RAN node/function to the AMF or it is signaled from the AMF to the RAN node/function. The signaling (and allocation of the identifier) can be performed during the initial UE context setup in the RAN node/function between the AMF and RAN node/function and/or during a UE context modification procedure as discussed above with respect to operation 200.

Protocol Data Unit PDU session establishment procedures are discussed below according to some embodiments with respect to FIGS. 3A and 3B.

Figure 3A:
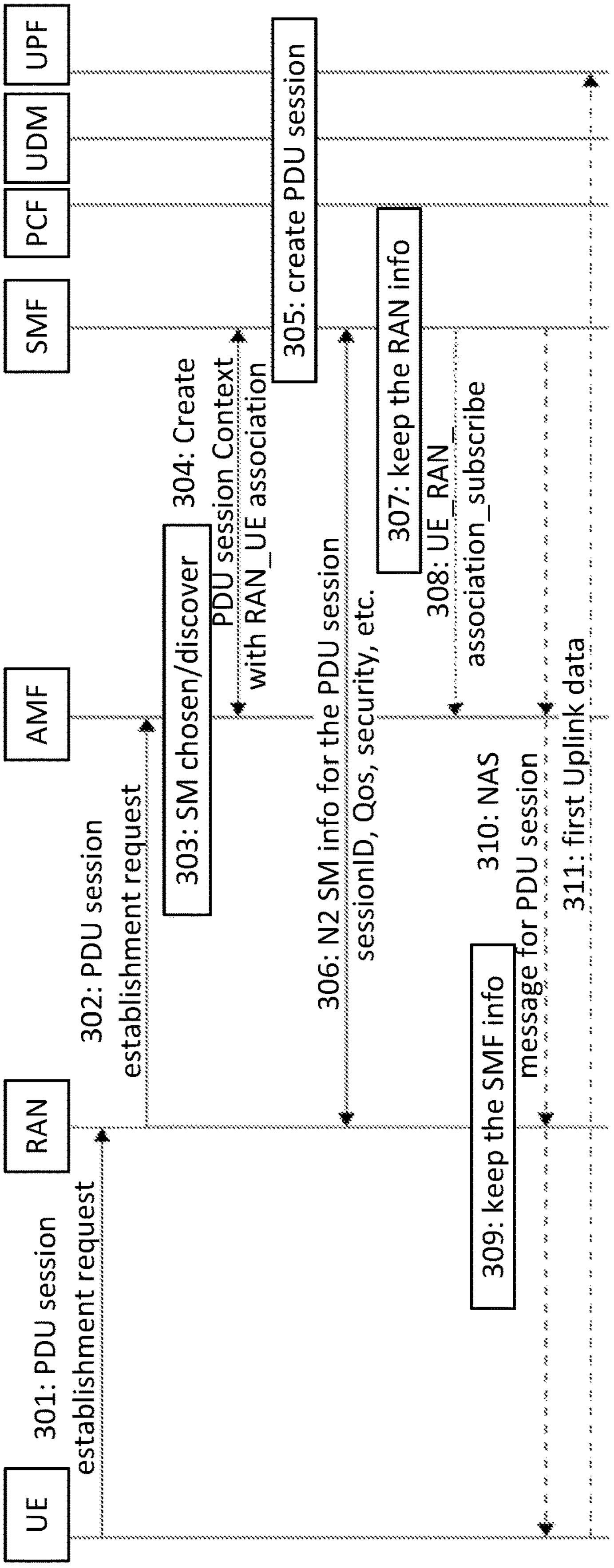
FIGS. 3A and 3B are message diagrams illustrating UE, RAN, AMF, and SMF operations according to some embodiments of inventive concepts.

FIG. 3A illustrates a PDU session establishment procedure according to some embodiments and how the SMF obtains RAN node information and contacts the RAN node directly. Operations 301, 302, and 303 are similar to operations of the current standard as set forth in reference [2]. At operation 301, the UE transmits a PDU session establishment request to the RAN node. At operation 302, the RAN node transmits a PDU session establishment request to the AMF node (responsive to receiving the PDU session establishment request from the UE at operation 301). At operation 303, the AMF node chooses/discovers an SMF node to be used for the PDU session for the UE.

At operation 304, the AMF sends a create PDU session context request message to the SMF to create a PDU session (based on choosing/discovering the SMF node at operation 303), and the AMF can include the RAN node information (e.g., RAN_UE association information) in the request as shown in FIG. 3A. Alternatively, if the AMF does not include the RAN node information at operation 304, the SMF can request that information after creating the PDU session using a UE_RAN_association service request message (and UE_RAN_association_service response message) as discussed below with respect to FIG. 3B.

Regarding the RAN node information, the RAN node information may include the IP address (and maybe port number as well) of the RAN node, and/or it can include a URL (e.g., a resource URL for the relevant RAN service resources for the UE) which can indicate the RAN node as well as its services.

At operation 305 the SMF, PCF, UDM, and/or UPF may create the PDU session for the UE. According to some embodiments, the SMF creates the PDU session with involvement from the UPF and/or involving interactions with the PCF and/or UDM. Creation of a PDU session is discussed, for example, in Sections 4.3.2.2 and 4.3.2.2.1 of 3GPP TS 23.502 v16.4.0 (Reference [2]). At operation 306, N2 SM information for the PDU session may be communicated between the SMF and the RAN, and the SM information for the PDU session may include a session ID for the PDU session, QoS information for the PDU session, security information for the PDU session, etc. For example, the SMF may contact the RAN node to setup PDU session resources using the RAN node information, and the RAN node may respond to the SMF directly for successful setup or failures/rejections at operation 306 of FIG. 3A. At operation 307, the SMF may save/keep the RAN information for the UE from operation 304 and/or from operation 306. According to some embodiments, the SMF may store information that is received at operation 304 and then update the context with information after operation 305 and/or after operation 306.

At operation 308, the SMF may transmit a UE_RAN_association_subscribe message to the AMF to subscribe to the AMF to request notification in the event that the UE information changes. According to some other embodiments, a subscription request may be transmitted from the SMF to the AMF when creating the PDU session context at operation 304. At operation 309, the RAN node keeps the SMF information for the UE for later usage, e.g. for Handover as discussed below with respect to FIG. 4.

At operation 310, a NAS message for the PDU session may be transmitted from the SMF (through the AMF and the RAN) to the UE. At operation 311, first uplink data may be transmitted from the UE to the UPF.

Figure 3B:
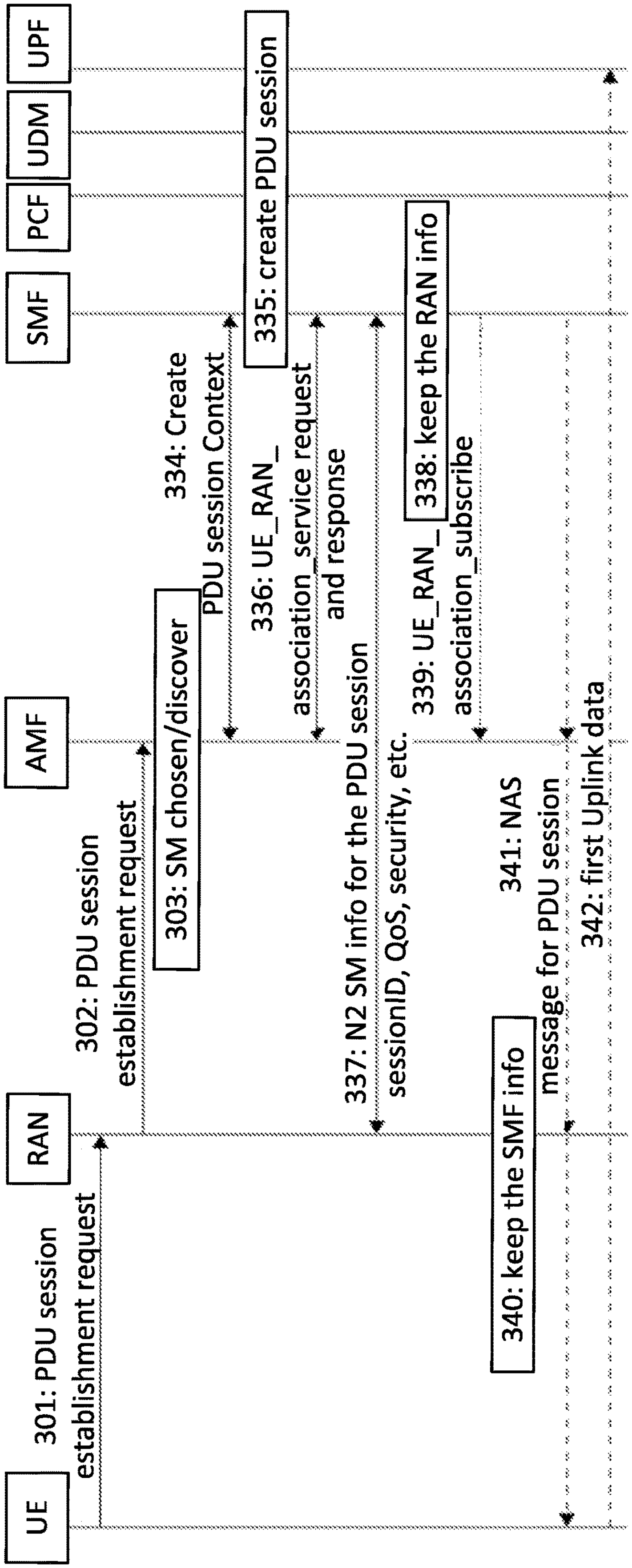

FIG. 3B illustrates a PDU session establishment procedure according to some other embodiments and how the SMF obtains RAN node information and contacts the RAN node directly. Operations 301, 302, and 303 are similar to operations of the current standard as set forth in reference [2] and may be performed as discussed above with respect to FIG. 3A. At operation 334, the AMF sends a create PDU session context request message to the SMF to create a PDU session, as shown in FIG. 3B.

At operation 335 the SMF, PCF, UDM, and/or UPF create the PDU session for the UE. According to some embodiments, the SMF creates the PDU session with involvement from the UPF and/or involving interactions with the PCF and/or UDM. Creation of a PDU session is discussed, for example, in Sections 4.3.2.2 and 4.3.2.2.1 of 3GPP TS 23.502 v16.4.0 (Reference [2]). In FIG. 3B, the AMF does not include the RAN node information at operation 334. Instead, the SMF requests that information after creating the PDU session using a UE_RAN_association service request message at operation 336. At operation 336, the SMF transmits a UE_RAN_association service request message and the AMF responds with a UE_RAN_association_service response message including the RAN node information. Operation 336 may be performed as discussed above with respect to operations 201 and 202 of FIG. 2. The RAN node information of the UE_RAN_association service response message may include the IP address (and maybe port number as well) of the RAN node, and/or it can include a URL (e.g., a resource URL for the relevant RAN service resources for the UE) which can indicate the RAN node as well as its services.

At operation 337, N2 SM information for the PDU session may be communicated between the SMF and the RAN, and the SM information for the PDU session may include a session ID for the PDU session, QoS information for the PDU session, security information for the PDU session, etc. For example, the SMF may contact the RAN node to setup PDU session resources using the RAN node information, and the RAN node may respond to the SMF directly for successful setup or failures/rejects at operation 337 of FIG. 3B. At operation 338, the SMF may save/keep the RAN information from operation 336 and/or operation 337.

At operation 339, the SMF may transmit a UE_RAN_association_subscribe message to the AMF to subscribe to the AMF for notifications in the event that the UE information changes. According to some other embodiments, a subscription request may be transmitted from the SMF to the AMF in the UE_RAN_association_service response message of operation 336. At operation 340, the RAN node keeps the SMF information for the UE for later usage, e.g. for Handover as discussed below with respect to FIG. 4.

At operation 341, a NAS message for the PDU session may be transmitted from the SMF (through the AMF and the RAN) to the UE. At operation 311, first uplink data may be transmitted from the UE to the UPF.

An Xn handover procedure is discussed below with respect to FIG. 4.

Figure 4:
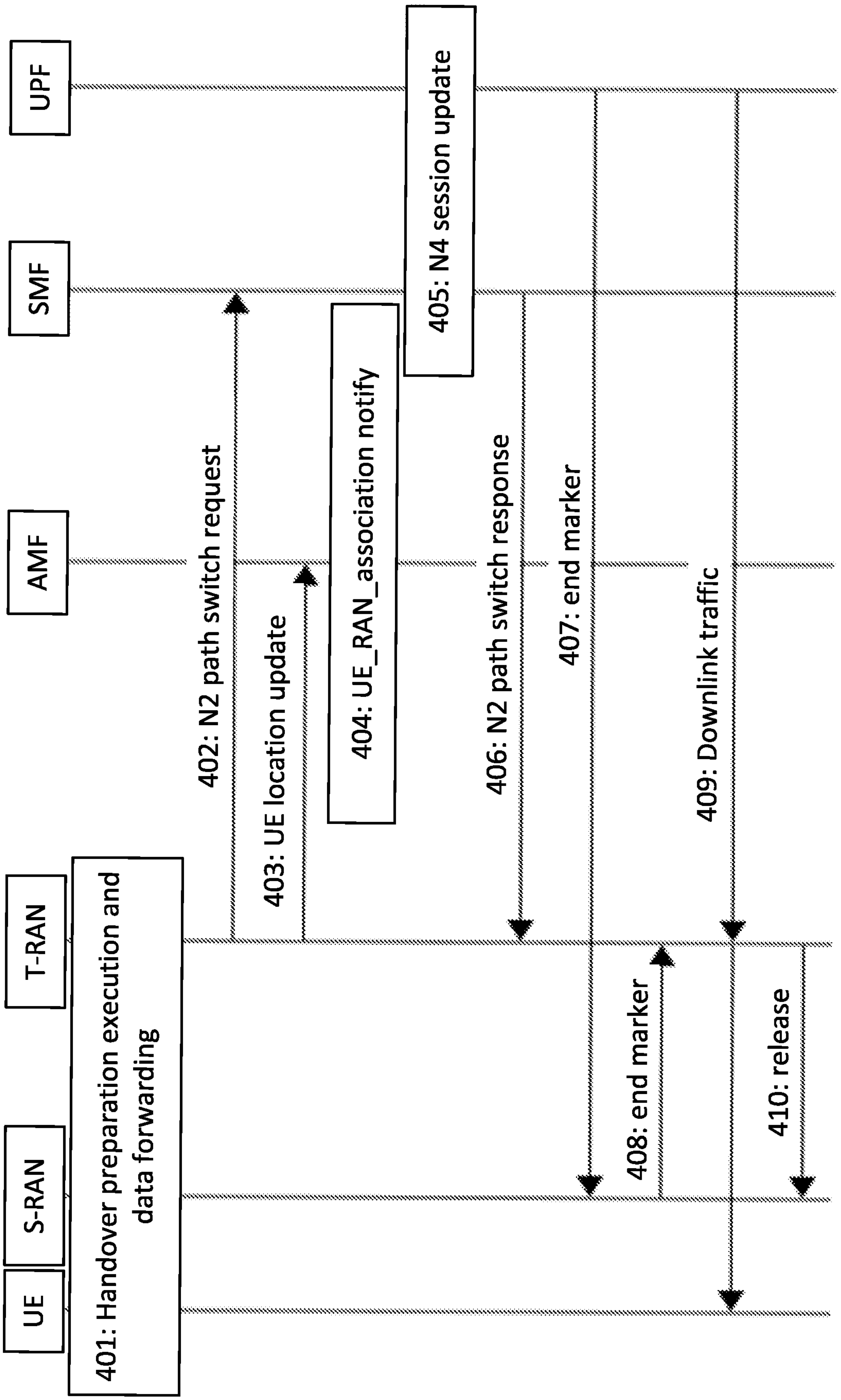
FIG. 4 is a message diagram illustrating UE, S-RAN, T-RAN, AMF, SMF, and UPF operations during handover according to some embodiments of inventive concepts.

FIG. 4 illustrates an example of Xn based handover. At operation 401, the source RAN node (S-RAN) does the handover preparation with the target RAN node (T-RAN). In operation 401, the S-RAN provides the SMF information to the T-RAN (e.g., based on information kept/saved at operation 309 of FIG. 3A and/or operation 340 of FIG. 3B). When the handover preparation is complete, the S-RAN initiates data forwarding to the T-RAN. The T-RAN will send a path switch request directly to the SMF (in the current standard, this is done through the AMF) at operation 402. After that, the T-RAN also updates the UE location in the AMF at operation 403. The AMF will then notify all the NFs that subscribe (e.g., based on a UE_RAN_association_subscribe message of operation 308 of FIG. 3A, operation 339 of FIG. 3B, and/or other subscription) for notification in the event that the UE information has changed at operation 404 using a UE_RAN_association_notify message (also referred to as a UE_RAN_association_notification message).

Note that if the UE context identifier changes due to the handover, then the AMF will provide notification of the new identifier at operation 404. The new UE context identifier can be generated by the T-RAN and be given to the SMF and AMF at operations 402 and 403, respectively. Alternatively, the new identifier can be generated by the AMF and be given to the T-RAN after the AMF receives the UE location update message at operation 403. At operation 405, an N4 session update may be performed, and the SMF may transmit an N2 path switch response directly to the T-RAN at operation 406.

After N4 session update at operation 405 and transmission of the N2 path switch response at operation 406, operations of FIG. 4 (e.g., operations 407, 408, 409, and/or 410) may be similar to operations of current standards.

At operation 407, the UPF may transmit and end marker message to the source RAN node, and the source RAN node may forward the end marker message to the target RAN node. At operation 409, downlink traffic may be transmitted from the UPF (through the target RAN node) to the UE, and at operation 410, the target RAN node may transmit a release message to the source RAN node.

Paging procedures are discussed below with respect to FIG. 5 according to some embodiments of inventive concepts.

Figure 5:
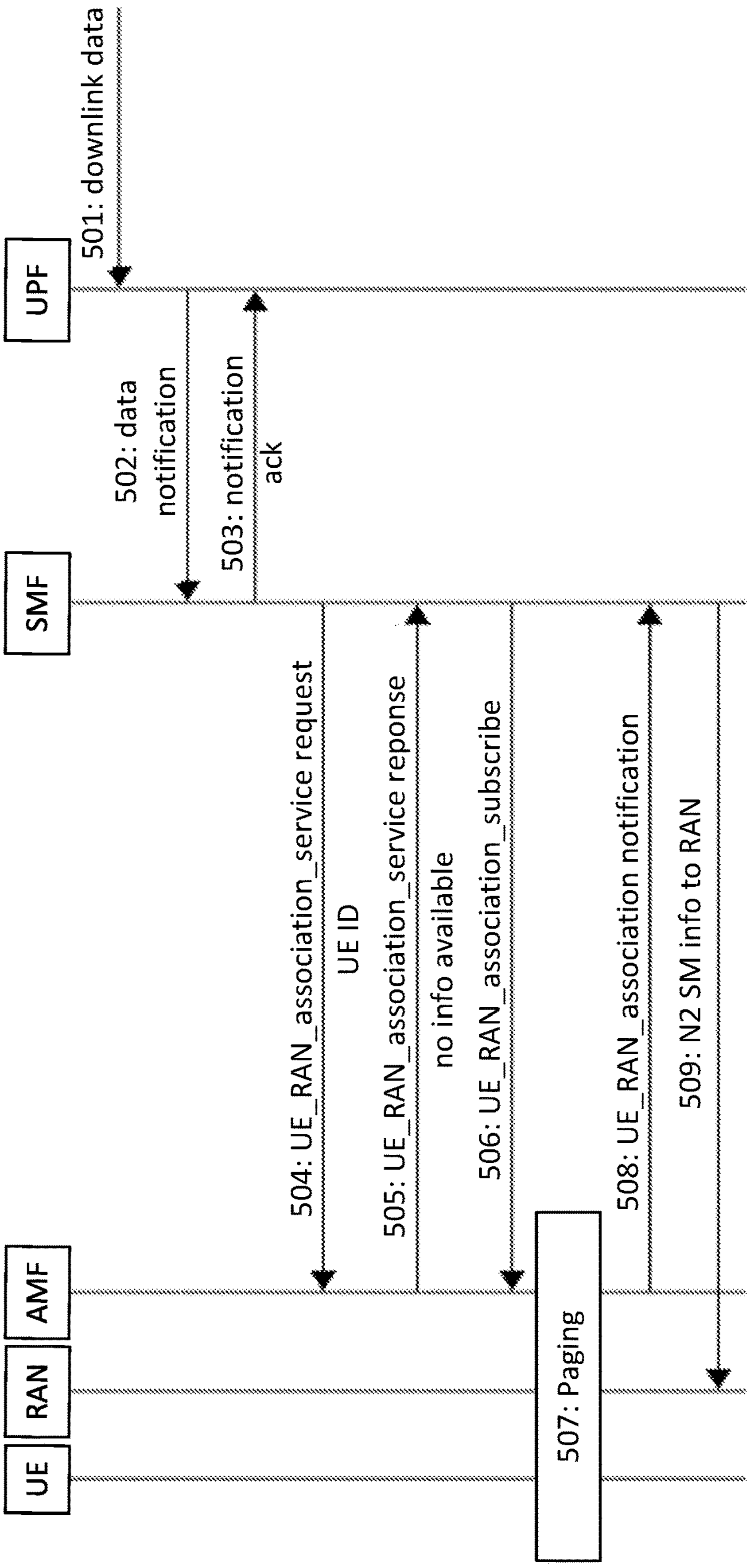
FIG. 5 is a message diagram illustrating UE, RAN, AMF, SMF, and UPF operations during paging according to some embodiments of inventive concepts.

FIG. 5 illustrates an example of a network triggered service request procedure according to some embodiments of inventive concepts. At operation 501, the UPF receives downlink data, and in response to receiving the downlink data, the UPF transmits a data notification message to the SMF at operation 502. When the SMF receives the data notification at operation 502, the SMF transmits a notification Acknowledgement (ACK) message to the UPF at operation 503 (responsive to the data notification message). According to some embodiments, the ACK message at operation 503 may be optional, and/or the transport by which message 502 is sent may be acknowledged so that an implicit acknowledgement is received by the UPF. Responsive to receiving the data notification message, the SMF will ask the AMF for the RAN node information of the UE using UE_RAN_association service request message (including the UE ID) of operation 504. The SMF may include as a reason for the request that it wants to contact the RAN node.

If the UE is in CM-Idle mode (meaning that the AMF does not know the current location of the UE), then the AMF will respond to the SMF with a UE_RAN_association_service response message including an indication that there is no RAN node information available for the UE at operation 505, and the AMF may initiate paging for the UE at operation 507. At operation 506, the SMF may transmit a UE_RAN_association_subscribe message to the AMF to request UE_RAN_association notifications. The UE_RAN_association_subscribe message may be transmitted responsive to receiving the indication that no RAN node information is available for the UE. According to some other embodiments, a request for subscription may be included in the UE_RAN_association_service request of operation 504. According to some embodiments, the UE_RAN_association_subscribe message of operation 506 may be transmitted after initiating the paging of operation 507.

Responsive to the UE responding to the paging of operation 507 and transitioning to the CM-Connected mode, the AMF can transmit a UE_RAN_association_notification message (also referred to as a UE_RAN_association_notify message) to the SMF to provide the UE_RAN node information at operation 508. At operation 509, the SMF may provide the N2 SM information to the RAN based on the UE RAN node information of operation 508.

If the UE is instead in CM-Connected Mode when the UE_RAN_association_service request message of operation 504 is received at the AMF (meaning that the AMF knows the current location of the UE), then the AMF will transmit a UE_RAN_association_service response message providing the RAN node information to the SMF. Then, the SMF can contact the RAN node directly to activate the corresponding UP connection by transmitting N2 SM information to the RAN node.

Operations of a Core Network CN Network Function NF node (implemented as a Core Network CN node 1500 using the structure of FIG. 8) will now be discussed with reference to the flow chart of FIG. 9A according to some embodiments of inventive concepts. For example, modules may be stored in memory 1505 of FIG. 8, and these modules may provide instructions so that when the instructions of a module are executed by respective CN NF node processing circuitry 1503, processing circuitry 1503 performs respective operations of the flow chart. For operations of FIG. 9A, the CN NF node may be a session management function SMF node.

According to some embodiments at operation 905, processing circuitry 1503 transmits an association service request message to an access and mobility management function AMF node, wherein the association service request message includes an identifier of a communication device UE. For example, the association service request message may be transmitted as discussed above with respect to the UE_RAN_association_service request message from operation 201 of FIG. 2 and/or operation 336 of FIG. 3B.

According to some embodiments at operation 909, processing circuitry 1503 receives (through network interface 1507) an association service response message from the AMF node (after transmitting the association service request message), wherein the association service response message includes information regarding a first radio access network RAN node with respect to the communication device. For example, the association service response message may be received as discussed above with respect to the UE_RAN_association_service response message from operation 202 of FIG. 2 and/or operation 336 of FIG. 3B.

According to some embodiments, the information regarding the RAN node includes information regarding the RAN node with which the communication device is connected, such as an identifier of the RAN node with which the communication device is connected. For example, the identifier of the RAN node may include a portion of at least one of a uniform resource location URL of the RAN node, an Internet Protocol IP address of the RAN node, and/or a gNB identifier of the RAN node. In addition, the association service response message may include at least one of a temporary identifier for the communication device, a temporary context identifier for the communication device, and/or a Subscription Permanent Identifier SUPI of the communication device.

According to some embodiments, the association service response message includes the identifier of the communication device (from the association service request message), and/or the association service request message and the association service response message include a same request identifier. For example, the identifier of the communication device may include a portion of at least one of Subscription Permanent Identifier SUPI of the communication device, a Subscription Concealed Identifier SUCI of the communication device, an International Mobile Subscriber Identifier IMSI of the communication device, a System Architecture Evolution Temporary Mobile Subscriber Identifier S-TMSI of the communication device, a context identifier of the communication device, and/or a group identifier for a plurality of communication devices in a group.

According to some embodiments at operation 915, processing circuitry 1503 provides (through network interface 1507) communication between the CN NF node and the first RAN node with which the communication device is connected using the information regarding the first RAN node. For example, communication may be provided as discussed above with respect to operation 203 of FIG. 2 and/or operation 337 of FIG. 3B.

According to some embodiments, the CN NF node may be a Session Management Function SMF node, and providing communication at operation 915 may include providing communication of session management information between the SMF node and the RAN node with which the communication device is connected using the information regarding the RAN node. Communication of such session management information may be provided, for example, as discussed above with respect to operation 306 of FIG. 3A and/or operation 337 of FIG. 3B. The session management information may include at least one of a Protocol Data Unit PDU session identifier associated with the communication device, Quality of Service QoS information associated with the communication device, user plane UP information associated with the communication device, and/or security information associated with the communication device. According to some embodiments, the session management information includes user plane information associated with the communication device, and the user plane information comprises a tunnel endpoint identifier.

According to some embodiments at operation 919, processing circuitry 1503 transmits (through network interface 1507) a subscription request message to the AMF node. For example, the subscription request message may be transmitted as discussed above with respect to operation 206 of FIG. 2, operation 308 of FIG. 3A, operation 339 of FIG. 3B, and/or operation 506 of FIG. 5. Alternatively, the subscription request message may be transmitted with and/or as an element of the association service request message of operation 905.

According to some embodiments, the subscription request message of operation 919 may be transmitted as an indication included in the association service request message, or the subscription request message of operation 919 may be transmitted after receiving the association service response message with the subscription request message including the identifier of the communication device.

According to some embodiments at operation 925, processing circuitry 1503 receives (through network interface 1507) an association notification update message from the AMF node after transmitting the subscription request message, wherein the association notification update message includes information regarding a second RAN node with which the communication device is connected. For example, the association notification update message may be received as discussed above with respect to operation 208 of FIG. 2 (receiving a UE_RAN_association notify_message, also referred to as a UE_RAN_association_notification message).

Figure 9A:
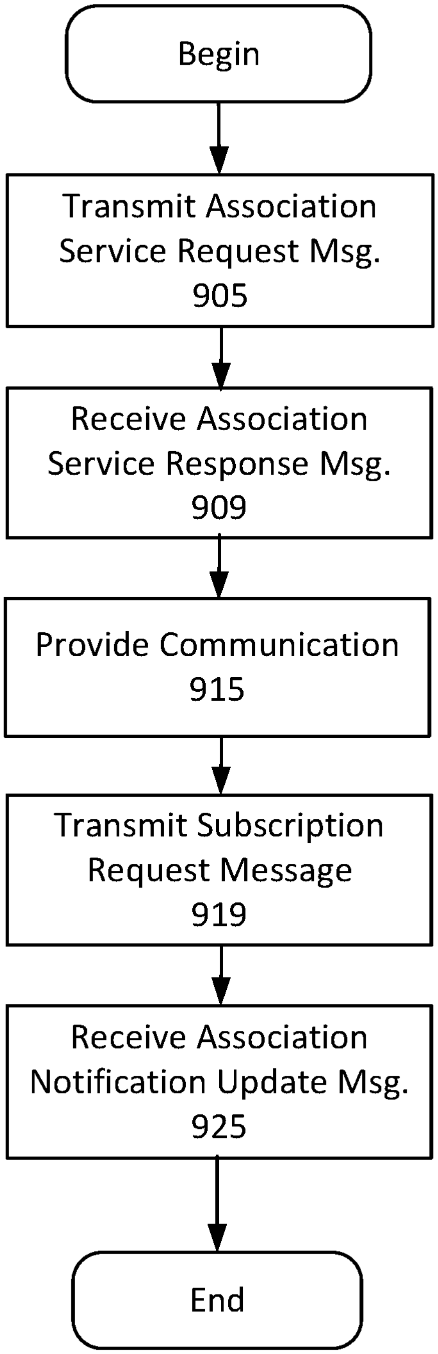
FIGS. 9A, 9B, and 9C are flow charts illustrating operations of CN NF (e.g., an SMF) nodes according to some embodiments of inventive concepts.

Various operations from the flow chart of FIG. 9A may be optional with respect to some embodiments of CN NF nodes and related methods. Regarding methods of some embodiments, for example, operations of blocks 905, 915, 919, and 925 of FIG. 9A may be optional.

Operations of a Core Network CN Network Function NF node (implemented as a Core Network CN node 1500 using the structure of FIG. 8) will now be discussed with reference to the flow chart of FIG. 9B according to some embodiments of inventive concepts. For example, modules may be stored in memory 1505 of FIG. 8, and these modules may provide instructions so that when the instructions of a module are executed by respective CN NF node processing circuitry 1503, processing circuitry 1503 performs respective operations of the flow chart. For operations of FIG. 9B, the CN NF node may be a session management function SMF node.

According to some embodiments at block 955, processing circuitry 1503 transmits (through network interface 1507) an association service request message to an access and mobility management function AMF node, wherein the association service request message includes an identifier of a communication device. For example, the association service request message may be transmitted as discussed above with respect to the UE_RAN_association_service request message of operation 504 of FIG. 5.

According to some embodiments at block 959, processing circuitry 1503 receives (through network interface 1507) an association service response message from the AMF node (after transmitting the association service request message), wherein the association service response message includes information regarding a radio access network RAN node that no RAN node information is available for the communication device from the AMF node. For example, the association service response message may be received as discussed above with respect to the UE_RAN_association_service response message of operation 505 of FIG. 5.

According to some embodiments, the AMF node may be a source AMF node, and the information regarding the RAN node may include the indication that no RAN node information is available for the communication device from the source AMF node. In addition, the information regarding the RAN node may include an identifier of a target AMF node having information available for the communication device. For example, the identifier of the target AMF node may include a uniform resource locator URL for the target AMF node. In addition, the association service response message may include at least one of a temporary identifier for the communication device, a temporary context identifier for the communication device, and/or a Subscription Permanent Identifier SUPI of the communication device.

According to some embodiments, the association service response message includes the identifier of the of the communication device, and/or the association service request message and the association service response message include a same request identifier. Moreover, the identifier of the communication device may include a portion of at least one of Subscription Permanent Identifier SUPI of the communication device, a Subscription Concealed Identifier SUCI of the communication device, an International Mobile Subscriber Identifier IMSI of the communication device, a System Architecture Evolution Temporary Mobile Subscriber Identifier S-TMSI of the communication device, a context identifier of the communication device, and/or a group identifier for a plurality of communication devices in a group.

Figure 9B:
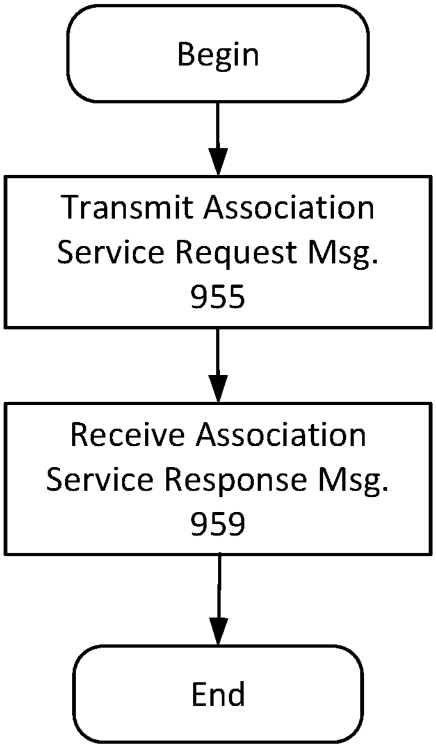

Various operations from the flow chart of FIG. 9B may be optional with respect to some embodiments of CN NF nodes and related methods. Regarding methods of some embodiments, for example, operations of block 955 of FIG. 9B may be optional.

Operations of a Core Network SMF node (implemented using the structure of FIG. 8) will now be discussed with reference to the flow chart of FIG. 9C according to some embodiments of inventive concepts. For example, modules may be stored in memory 1505 of FIG. 8, and these modules may provide instructions so that when the instructions of a module are executed by respective SMF node processing circuitry 1503, processing circuitry 1503 performs respective operations of the flow chart. For operations of FIG. 9C, the CN NF node may be a session management function SMF node.

According to some embodiments at operation block 981, processing circuitry 1503 receives (through network interface 1507) a message from an access and mobility management function AMF node, wherein the message includes information regarding a radio access network RAN node with which a communication device is connected. For example, the message may be received during creation of a PDU session context for the communication device UE as discussed above with respect to operation 304 of FIG. 3A.

According to some embodiments, the information regarding the RAN may include at least one of an identifier of the RAN node with which the communication device is connected. For example, the identifier of the RAN node may include a portion of at least one of a uniform resource location URL of the RAN node, an Internet Protocol IP address of the RAN node, and/or a gNB identifier of the RAN node. In addition, the message may include at least one of a temporary identifier for the communication device, a temporary context identifier for the communication device, and/or a Subscription Permanent Identifier SUPI of the communication device.

According to some embodiments at operation 985, processing circuitry 1503 provides (through network interface 1507) communication between the SMF node and the RAN node with which the communication device is connected using the information regarding the first RAN node. For example, communication may be provided as discussed above with respect to operation 306 of FIG. 3A.

Figure 9C:
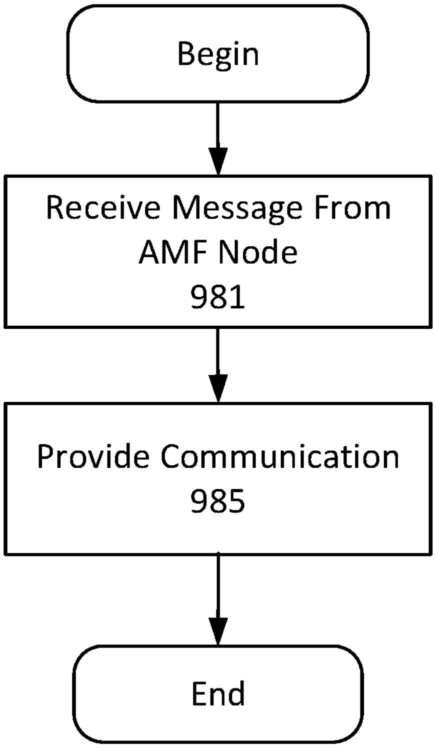

Various operations from the flow chart of FIG. 9C may be optional with respect to some embodiments of SMF nodes and related methods. Regarding methods of some embodiments, for example, operations of blocks 985 of FIG. 9C may be optional.

Operations of a RAN node 1400 (implemented using the structure of FIG. 7) will now be discussed with reference to the flow chart of FIG. 10A according to some embodiments of inventive concepts. For example, modules may be stored in memory 1405 of FIG. 7, and these modules may provide instructions so that when the instructions of a module are executed by respective RAN node processing circuitry 1403, processing circuitry 1403 performs respective operations of the flow chart. In embodiments 10A, RAN node 1400 may be a first RAN node acting as a source RAN node (S-RAN) during handover of a communication device to a second RAN node acting as a target RAN node (T-RAN).

According to some embodiments at operation 1005, processing circuitry 1403 receives (through network interface 1407) communication information from a first core network CN network function NF node (e.g., a Session Management Function SMF node) and from a second CN NF node (e.g., an Access and Mobility Function AMF node), wherein the communication information from the first and second CN NF nodes is used to support communication for the communication device that is connected to the first RAN node. For example, the communication may be received at the first RAN node at operation 1005 as discussed above with respect to operation 203 of FIG. 2, operation 306 of FIG. 3A and/or operation 337 of FIG. 3B.

According to some embodiments at operation 1009, processing circuitry 1403 initiates a handover of the communication device.

According to some embodiments at operation 1015, processing circuitry 1403 transmits (through network interface 1407) the communication information to the second RAN node (T-RAN) responsive to initiating a handover of the communication device to a second RAN node. For example, the communication information may be transmitted as discussed above with respect to operation 401 of FIG. 4.

According to some embodiments, the first CN NF node is a Session Management Function SMF node, and the communication information includes session management information that is used to support communication for the communication device. The session management information, for example, may include at least one of a Protocol Data Unit PDU session identifier associated with the communication device, Quality of Service QoS information associated with the communication device, user plane UP information associated with the communication device, and/or security information associated with the communication device. Moreover, the session management information may include user plane information associated with the communication device, and the user plane information may include a tunnel endpoint identifier.

According to some embodiments, the second CN NF node is an Access and Mobility Management Function AMF node.

Figure 10A:
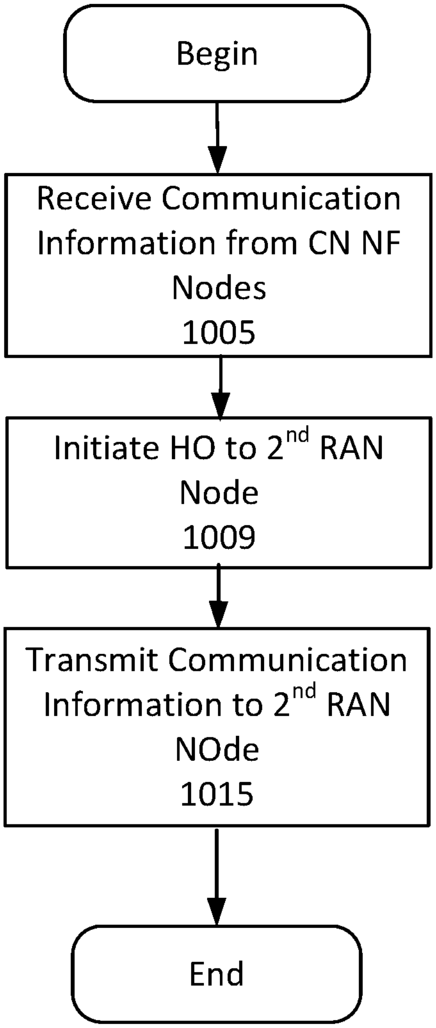
FIGS. 10A and 10B are flow charts illustrating operations of RAN nodes according to some embodiments of inventive concepts.

Various operations from the flow chart of FIG. 10A may be optional with respect to some embodiments of RAN nodes and related methods. Regarding methods of some embodiments, for example, operations of block 1009 of FIG. 10A may be optional.

Operations of a RAN node 1400 (implemented using the structure of FIG. 7) will now be discussed with reference to the flow chart of FIG. 10B according to some embodiments of inventive concepts. For example, modules may be stored in memory 1405 of FIG. 7, and these modules may provide instructions so that when the instructions of a module are executed by respective RAN node processing circuitry 1403, processing circuitry 1403 performs respective operations of the flow chart. In embodiments 10B, RAN node 1400 may be a first RAN node acting as a target RAN node (T-RAN) during handover of a communication device from a second RAN node acting as a source RAN node (S-RAN).

According to some embodiments at operation 1055, processing circuitry 1403 receives (through network interface 1407) communication information from the second RAN node. The communication information is used to support communication for the communication device that is being handed over from the second RAN node to the first RAN node, and the communication information relates to a first core network CN network function NF node (e.g., an SMF node) and to a second CN NF node (e.g., an AMF node). For example, the communication information may be received at the first RAN node as discussed above with respect to operation 401 of FIG. 4.

According to some embodiments, the first CN NF node is a Session Management Function SMF node, and the communication information includes session management information that is used to support communication for the communication device. For example, the session management information includes at least one of a Protocol Data Unit PDU session identifier associated with the communication device, Quality of Service QoS information associated with the communication device, user plane information associated with the communication device, and/or security information associated with the communication device. Moreover, the session management information may include user plane information associated with the communication device, and the user plane information may include a tunnel endpoint identifier. According to some embodiments, the second CN NF node is an Access and Mobility Management Function AMF node.

According to some embodiments at operation 1509, processing circuitry 1403 provides communication with the first CN NF node (e.g., SMF node) based on the communication information. For example, communication may be provided with the first CN NF node (e.g., SMF node) as discussed above with respect to operation 402 of FIG. 4. According to some embodiments, providing communication with the first CN NF node (e.g., SMF node) includes transmitting a path switch request to the SMF node based on the communication information. According to some embodiments, the path switch request is transmitted directly to the SMF node (e.g., without using an access and mobility management function AMF node).

According to some embodiments at operation 1065, processing circuitry 1403 receives (through network interface 1407) a path switch response from the SMF node, wherein the path switch response corresponds to the path switch request discussed above with respect to operation 1509. For example, the path switch response may be received as discussed above with respect to operation 406 of FIG. 4.

Figure 10B:
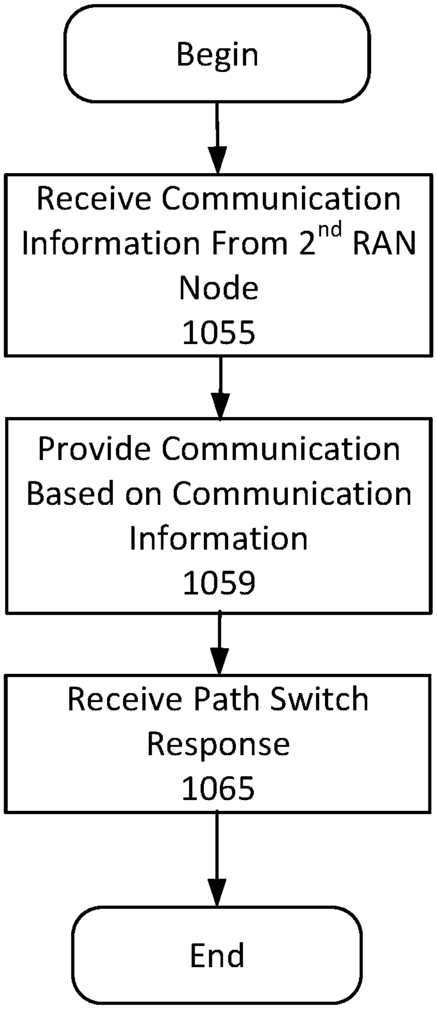

Various operations from the flow chart of FIG. 10B may be optional with respect to some embodiments of RAN nodes and related methods. Regarding methods of some embodiments, for example, operations of block 1065 of FIG. 10B may be optional.

Operations of a Core Network CN node 1500 (implemented using the structure of FIG. 8) will now be discussed with reference to the flow chart of FIG. 11A according to some embodiments of inventive concepts. For example, modules may be stored in memory 1505 of FIG. 8, and these modules may provide instructions so that when the instructions of a module are executed by respective CN node processing circuitry 1503, processing circuitry 1503 performs respective operations of the flow chart. For operations of FIG. 11A, the CN NF node may be an AMF node.

According to some embodiments at operation 1101, processing circuitry 1503 communicates an identifier of a communication device with a first RAN node (i.e., between the first RAN node and the AMF node), wherein the communication device is in a connected state with the first RAN node. According to some embodiments, the identifier of the communication device may be communicated between the RAN node and the AMF node as part of a context setup and/or context modification for the communication device. For example, the identifier may be communicated as part of the UE Context Setup/Modification of operation 200 of FIG. 2, and/or as part of the PDU session establishment request of operation 302 of FIG. 3A or FIG. 3B.

According to some embodiments at operation 1105, processing circuitry 1503 receives (through network interface 1507) an association service request message from a CN NF node (e.g., an SMF node), wherein the association service request message includes the identifier of the communication device that is in a connected state with the first RAN node. For example, the association service request message may be received as discussed above with respect to operation 201 of FIG. 2 and/or operation 336 of FIG. 3B.

According to some embodiments at operation 1109, processing circuitry 1503 transmits (through network interface 1507)) an association service response message to the CN NF node (e.g., an SMF node) responsive to receiving the association service request message (and after communicating the identifier of the communication device), wherein the message includes information regarding a radio access network, RAN, node with respect to the communication device. The information regarding the RAN node may include an identifier of the RAN node with which the communication device is connected, wherein the identifier of the RAN Node may include at least one of a uniform resource location URL of the RAN node, an Internet Protocol IP address of the RAN node, and/or a gNB identifier of the RAN node. In addition, the message may include at least one of a temporary identifier for the communication device, a temporary context identifier for the communication device, and/or a Subscription Permanent Identifier, SUPI, of the communication device. For example, the association service response message may be transmitted as discussed above with respect to operation 202 of FIG. 2, operation 304 of FIG. 3A, operation 336 of FIG. 3B, and/or operation 505 of FIG. 5.

According to some embodiments, the association service response message includes the identifier of the communication device, and/or the association service request message and the association service response message include a same request identifier. According to some embodiments, the identifier of the communication device includes a portion of at least one of Subscription Permanent Identifier SUPI of the communication device, a Subscription Concealed Identifier SUCI of the communication device, an International Mobile Subscriber Identifier IMSI of the communication device, a System Architecture Evolution Temporary Mobile Subscriber Identifier S-TMSI of the communication device, a context identifier of the communication device, and/or a group identifier for a plurality of communication devices in a group.

According to some embodiments at operation 1115, processing circuitry 1503 receives (through network interface 1507) a subscription request message from the CN NF node (e.g., the SMF node). The subscription request may be received, for example, as discussed above with respect to operation 206 of FIG. 2, operation 308 of FIG. 3A, and/or operation 339 of FIG. 3B. According to some embodiments, the subscription request message may be received as an indication that is included in the association service request message. According to some other embodiments, the subscription request message may be received after transmitting the association service response message with the subscription request message including the identifier of the communication device (e.g., as discussed above with respect to operation 206 of FIG. 2, operation 308 of FIG. 3A, and/or operation 339 of FIG. 3B).

According to some embodiments at operation 1119, processing circuitry 1503 transmits an association notification update message to the CN NF node, wherein the association notification update message includes information regarding a second RAN node with which the communication device is connected. For example, the association notification update message may be transmitted as discussed above with respect to operation 208 of FIG. 2. According to some embodiment, the association notification update message is transmitted responsive to receiving the subscription request message and responsive to receiving an indication of handover of the communication device from the first RAN node to the second RAN node.

Figure 11A:
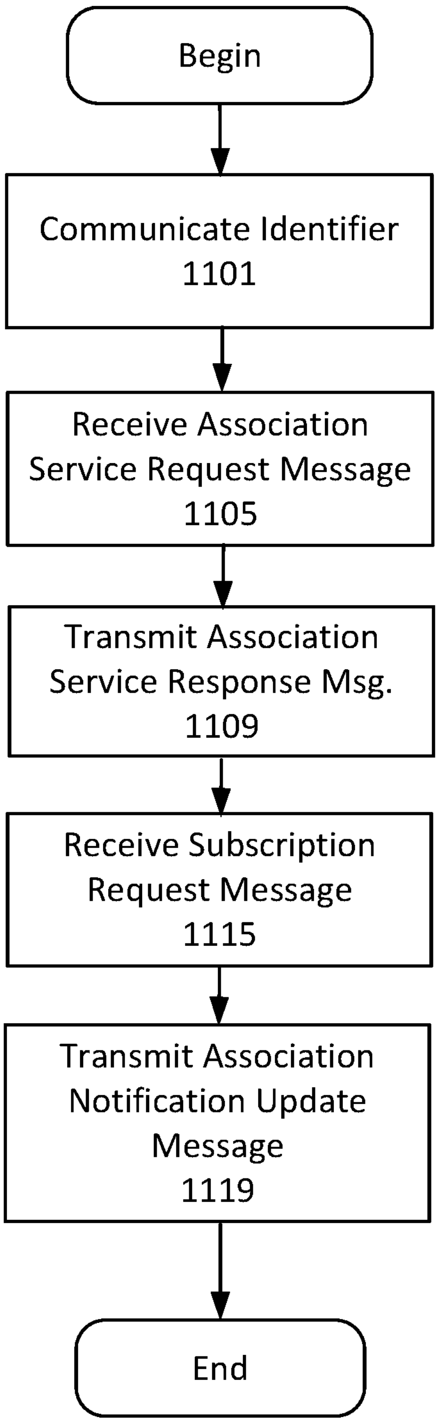
FIGS. 11A and 11B are flow charts illustrating operations of AMF nodes according to some embodiments of inventive concepts.

Various operations from the flow chart of FIG. 11A may be optional with respect to some embodiments of CN nodes and related methods. Regarding methods of some embodiments, for example, operations of blocks 1101, 1105, 1115, and/or 1119 of FIG. 11A may be optional.

Operations of a Core Network CN node 1500 (implemented using the structure of FIG. 8) will now be discussed with reference to the flow chart of FIG. 11B according to some embodiments of inventive concepts. For example, modules may be stored in memory 1505 of FIG. 8, and these modules may provide instructions so that when the instructions of a module are executed by respective CN node processing circuitry 1503, processing circuitry 1503 performs respective operations of the flow chart. For operations of FIG. 11B, the CN NF node may be an AMF node.

According to some embodiments at operation 1155, processing circuitry 1503 receives an association service request message from the CN NF node, wherein the association service request message includes an identifier of the communication device. For example, the association service request message may be received as discussed above with respect to operation 504 of FIG. 5.

According to some embodiments at operation 1159, processing circuitry 1503 transmits an association service response message to a core network CN network function NF node responsive to receiving the association service request message, wherein the message includes information regarding a radio access network RAN node with respect to a communication device. Moreover, the information regarding the RAN node may include an indication that no RAN information is available for the communication device responsive to the communication device being in an idle state. In addition, the association service response message may include at least one of a temporary identifier for the communication device, a temporary context identifier for the communication device, and/or a Subscription Permanent Identifier SUPI of the communication device. For example, the association service response message may be transmitted to the core network node as discussed above with respect to operation 505 of FIG. 5.

According to some embodiments, the AMF node is a source AMF node, and the information regarding the RAN node includes the indication that no RAN node information is available for the communication device from the source RAN node. In addition, the information regarding the RAN node may include an identifier (e.g., a uniform resource locator, URL) of a target AMF node having information available for the communication device. According to some embodiments, the association service response message may include the identifier of the communication device, and/or the association service request message and the association service response message may include the request identifier. According to some embodiments, the identifier of the communication device may include a portion of at least one of Subscription Permanent Identifier SUPI of the communication device, a Subscription Concealed Identifier SUCI of the communication device, an International Mobile Subscriber Identifier IMSI of the communication device, a System Architecture Evolution Temporary Mobile Subscriber Identifier S-TMSI of the communication device, a context identifier of the communication device, and/or a group identifier for a plurality of communication devices in a group.

Figure 11B:
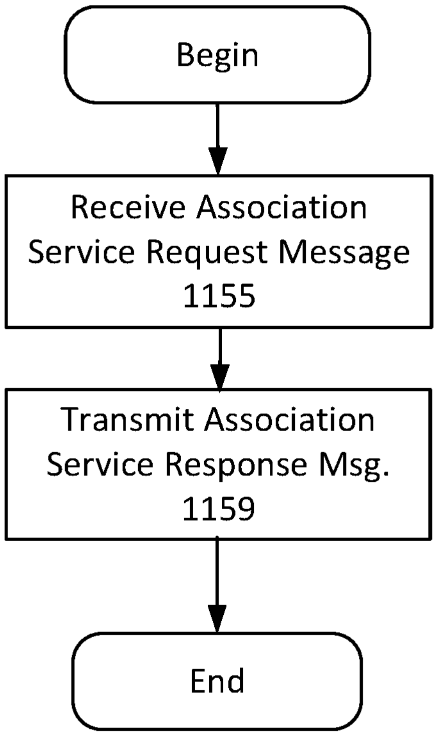

Various operations from the flow chart of FIG. 11B may be optional with respect to some embodiments of CN nodes and related methods. Regarding methods of some embodiments, for example, operations of block 1155 of FIG. 11B may be optional.

While examples are discussed with respect to a CN NF node requesting/receiving information regarding a RAN node from an AMF node, other NF nodes may request/receive such information from an AMF node according to other embodiments of inventive concepts. For example, a network management function node (e.g., an Open Radio Access Network O-RAN Non-Real Time RAN Intelligent Controller Non-RT RIC) and/or a RAN function node may request/receive such information from an AMF node (e.g., for a UE context fetch).

Explanations are provided below for various abbreviations/acronyms used in the present disclosure.

Abbreviation Explanation

3GPP 3rd Generation Partnership Project
5G 5th Generation
AMF Access and Mobility Management Function
AN Access Network
AS Access Stratum
AUSF Authentication Server Function
CP Control Plane
CN Core Network
DN Data Network
ID Identifier
IMSI International Mobile Subscriber Identity
IP Internet Protocol
LMF Location Management Function
NAS Non-Access Stratum
NEF Network Exposure Function
NF Network Function
NG Next Generation
NRF Network Repository Function
NSSF Network Slice Selection Function
NWDAF Network Data Analytics Function
PCF Policy Control Function
PDU Protocol Data Unit
QoS Quality of Service
RAN Radio Access Network
SAE System Architecture Evolution
S-TMSI SAE-Temporary Mobile Subscriber Identity
SBA Service Based Architecture
SM Session Management
SMF Session Management Function
SUCI Subscription Concealed Identifier
SUPI Subscription Permanent Identifier
TMSI Temporary Mobile Subscriber Identity
UDM Unified Data Management
UE User Equipment
UP User Plane
UPF User Plane Function
URL Uniform Resource Locator References are identified below.

[1] 3GPP TS 23.501 V16.4.0 (2020 March), System Architecture for the 5G system (5GS), Release 16 https://portal.3gpp.org/desktopmodules/Specifications/SpecificationDetails.aspx?s pecificationId=3144

[2] 3GPP TS 23.502 V16.4.0 (2020 March), Procedures for the 5G system (5GS), Release 16, https://portal.3gpp.org/desktopmodules/Specifications/SpecificationDetails.aspx?s pecificationId=3145

Additional explanation is provided below.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 12:
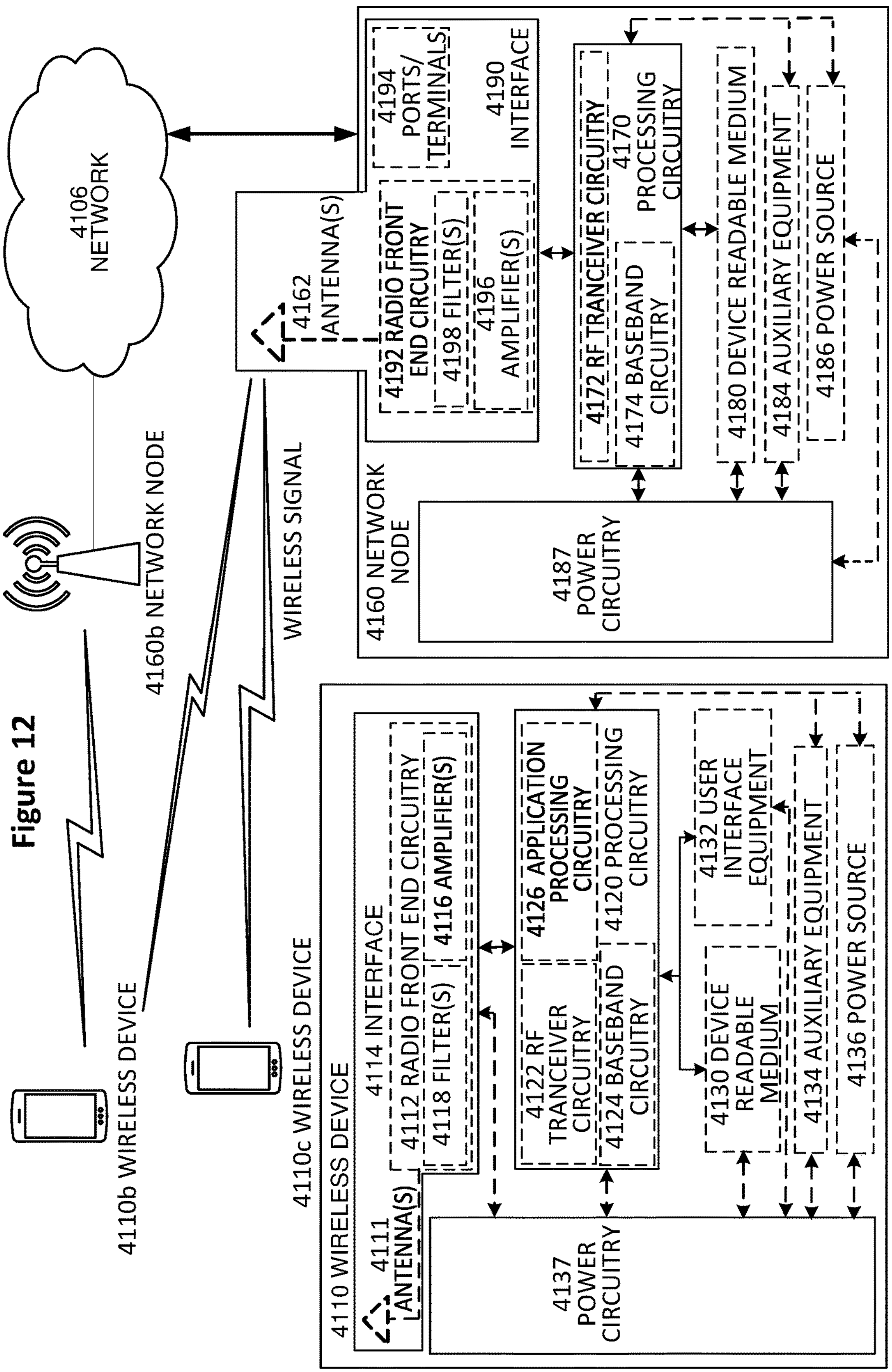
FIG. 12 is a block diagram of a wireless network in accordance with some embodiments.

FIG. 12 illustrates a wireless network in accordance with some embodiments.

Although the subject matter described herein may be implemented in any appropriate type of system using any suitable components, the embodiments disclosed herein are described in relation to a wireless network, such as the example wireless network illustrated in FIG. 12. For simplicity, the wireless network of FIG. 12 only depicts network 4106, network nodes 4160 and 4160*b*, and WDs 4110, 4110*b*, and 4110*c* (also referred to as mobile terminals). In practice, a wireless network may further include any additional elements suitable to support communication between wireless devices or between a wireless device and another communication device, such as a landline telephone, a service provider, or any other network node or end device. Of the illustrated components, network node 4160 and wireless device (WD) 4110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 4106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 4160 and WD 4110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 12, network node 4160 includes processing circuitry 4170, device readable medium 4180, interface 4190, auxiliary equipment 4184, power source 4186, power circuitry 4187, and antenna 4162. Although network node 4160 illustrated in the example wireless network of FIG. 12 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 4160 are depicted as single boxes located within a larger box, or nested within multiple boxes, in practice, a network node may comprise multiple different physical components that make up a single illustrated component (e.g., device readable medium 4180 may comprise multiple separate hard drives as well as multiple RAM modules).

Similarly, network node 4160 may be composed of multiple physically separate components (e.g., a NodeB component and a RNC component, or a BTS component and a BSC component, etc.), which may each have their own respective components. In certain scenarios in which network node 4160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 4160 may be configured to support multiple radio access technologies (RATs). In such embodiments, some components may be duplicated (e.g., separate device readable medium 4180 for the different RATs) and some components may be reused (e.g., the same antenna 4162 may be shared by the RATs). Network node 4160 may also include multiple sets of the various illustrated components for different wireless technologies integrated into network node 4160, such as, for example, GSM, WCDMA, LTE, NR, WiFi, or Bluetooth wireless technologies. These wireless technologies may be integrated into the same or different chip or set of chips and other components within network node 4160.

Processing circuitry 4170 is configured to perform any determining, calculating, or similar operations (e.g., certain obtaining operations) described herein as being provided by a network node. These operations performed by processing circuitry 4170 may include processing information obtained by processing circuitry 4170 by, for example, converting the obtained information into other information, comparing the obtained information or converted information to information stored in the network node, and/or performing one or more operations based on the obtained information or converted information, and as a result of said processing making a determination.

Processing circuitry 4170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 4160 components, such as device readable medium 4180, network node 4160 functionality. For example, processing circuitry 4170 may execute instructions stored in device readable medium 4180 or in memory within processing circuitry 4170. Such functionality may include providing any of the various wireless features, functions, or benefits discussed herein. In some embodiments, processing circuitry 4170 may include a system on a chip (SOC).

In some embodiments, processing circuitry 4170 may include one or more of radio frequency (RF) transceiver circuitry 4172 and baseband processing circuitry 4174. In some embodiments, radio frequency (RF) transceiver circuitry 4172 and baseband processing circuitry 4174 may be on separate chips (or sets of chips), boards, or units, such as radio units and digital units. In alternative embodiments, part or all of RF transceiver circuitry 4172 and baseband processing circuitry 4174 may be on the same chip or set of chips, boards, or units In certain embodiments, some or all of the functionality described herein as being provided by a network node, base station, eNB or other such network device may be performed by processing circuitry 4170 executing instructions stored on device readable medium 4180 or memory within processing circuitry 4170. In alternative embodiments, some or all of the functionality may be provided by processing circuitry 4170 without executing instructions stored on a separate or discrete device readable medium, such as in a hard-wired manner In any of those embodiments, whether executing instructions stored on a device readable storage medium or not, processing circuitry 4170 can be configured to perform the described functionality. The benefits provided by such functionality are not limited to processing circuitry 4170 alone or to other components of network node 4160, but are enjoyed by network node 4160 as a whole, and/or by end users and the wireless network generally.

Device readable medium 4180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 4170. Device readable medium 4180 may store any suitable instructions, data or information, including a computer program, software, an application including one or more of logic, rules, code, tables, etc. and/or other instructions capable of being executed by processing circuitry 4170 and, utilized by network node 4160. Device readable medium 4180 may be used to store any calculations made by processing circuitry 4170 and/or any data received via interface 4190. In some embodiments, processing circuitry 4170 and device readable medium 4180 may be considered to be integrated.

Interface 4190 is used in the wired or wireless communication of signalling and/or data between network node 4160, network 4106, and/or WDs 4110. As illustrated, interface 4190 comprises port(s)/terminal(s) 4194 to send and receive data, for example to and from network 4106 over a wired connection. Interface 4190 also includes radio front end circuitry 4192 that may be coupled to, or in certain embodiments a part of, antenna 4162. Radio front end circuitry 4192 comprises filters 4198 and amplifiers 4196. Radio front end circuitry 4192 may be connected to antenna 4162 and processing circuitry 4170. Radio front end circuitry may be configured to condition signals communicated between antenna 4162 and processing circuitry 4170. Radio front end circuitry 4192 may receive digital data that is to be sent out to other network nodes or WDs via a wireless connection. Radio front end circuitry 4192 may convert the digital data into a radio signal having the appropriate channel and bandwidth parameters using a combination of filters 4198 and/or amplifiers 4196. The radio signal may then be transmitted via antenna 4162. Similarly, when receiving data, antenna 4162 may collect radio signals which are then converted into digital data by radio front end circuitry 4192. The digital data may be passed to processing circuitry 4170.

In other embodiments, the interface may comprise different components and/or different combinations of components.

In certain alternative embodiments, network node 4160 may not include separate radio front end circuitry 4192, instead, processing circuitry 4170 may comprise radio front end circuitry and may be connected to antenna 4162 without separate radio front end circuitry 4192. Similarly, in some embodiments, all or some of RF transceiver circuitry 4172 may be considered a part of interface 4190. In still other embodiments, interface 4190 may include one or more ports or terminals 4194, radio front end circuitry 4192, and RF transceiver circuitry 4172, as part of a radio unit (not shown), and interface 4190 may communicate with baseband processing circuitry 4174, which is part of a digital unit (not shown).

Antenna 4162 may include one or more antennas, or antenna arrays, configured to send and/or receive wireless signals. Antenna 4162 may be coupled to radio front end circuitry 4192 and may be any type of antenna capable of transmitting and receiving data and/or signals wirelessly. In some embodiments, antenna 4162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 4162 may be separate from network node 4160 and may be connectable to network node 4160 through an interface or port.

Antenna 4162, interface 4190, and/or processing circuitry 4170 may be configured to perform any receiving operations and/or certain obtaining operations described herein as being performed by a network node. Any information, data and/or signals may be received from a wireless device, another network node and/or any other network equipment. Similarly, antenna 4162, interface 4190, and/or processing circuitry 4170 may be configured to perform any transmitting operations described herein as being performed by a network node. Any information, data and/or signals may be transmitted to a wireless device, another network node and/or any other network equipment.

Power circuitry 4187 may comprise, or be coupled to, power management circuitry and is configured to supply the components of network node 4160 with power for performing the functionality described herein. Power circuitry 4187 may receive power from power source 4186. Power source 4186 and/or power circuitry 4187 may be configured to provide power to the various components of network node 4160 in a form suitable for the respective components (e.g., at a voltage and current level needed for each respective component). Power source 4186 may either be included in, or external to, power circuitry 4187 and/or network node 4160. For example, network node 4160 may be connectable to an external power source (e.g., an electricity outlet) via an input circuitry or interface such as an electrical cable, whereby the external power source supplies power to power circuitry 4187. As a further example, power source 4186 may comprise a source of power in the form of a battery or battery pack which is connected to, or integrated in, power circuitry 4187. The battery may provide backup power should the external power source fail. Other types of power sources, such as photovoltaic devices, may also be used.

Alternative embodiments of network node 4160 may include additional components beyond those shown in FIG. 12 that may be responsible for providing certain aspects of the network node's functionality, including any of the functionality described herein and/or any functionality necessary to support the subject matter described herein. For example, network node 4160 may include user interface equipment to allow input of information into network node 4160 and to allow output of information from network node 4160. This may allow a user to perform diagnostic, maintenance, repair, and other administrative functions for network node 4160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 4110 includes antenna 4111, interface 4114, processing circuitry 4120, device readable medium 4130, user interface equipment 4132, auxiliary equipment 4134, power source 4136 and power circuitry 4137. WD 4110 may include multiple sets of one or more of the illustrated components for different wireless technologies supported by WD 4110, such as, for example, GSM, WCDMA, LTE, NR, WiFi, WiMAX, or Bluetooth wireless technologies, just to mention a few. These wireless technologies may be integrated into the same or different chips or set of chips as other components within WD 4110.

Antenna 4111 may include one or more antennas or antenna arrays, configured to send and/or receive wireless signals, and is connected to interface 4114. In certain alternative embodiments, antenna 4111 may be separate from WD 4110 and be connectable to WD 4110 through an interface or port. Antenna 4111, interface 4114, and/or processing circuitry 4120 may be configured to perform any receiving or transmitting operations described herein as being performed by a WD. Any information, data and/or signals may be received from a network node and/or another WD. In some embodiments, radio front end circuitry and/or antenna 4111 may be considered an interface.

As illustrated, interface 4114 comprises radio front end circuitry 4112 and antenna 4111. Radio front end circuitry 4112 comprise one or more filters 4118 and amplifiers 4116. Radio front end circuitry 4112 is connected to antenna 4111 and processing circuitry 4120, and is configured to condition signals communicated between antenna 4111 and processing circuitry 4120. Radio front end circuitry 4112 may be coupled to or a part of antenna 4111. In some embodiments, WD 4110 may not include separate radio front end circuitry 4112; rather, processing circuitry 4120 may comprise radio front end circuitry and may be connected to antenna 4111. Similarly, in some embodiments, some or all of RF transceiver circuitry 4122 may be considered a part of interface 4114. Radio front end circuitry 4112 may receive digital data that is to be sent out to other network nodes or WDs via a wireless connection. Radio front end circuitry 4112 may convert the digital data into a radio signal having the appropriate channel and bandwidth parameters using a combination of filters 4118 and/or amplifiers 4116. The radio signal may then be transmitted via antenna 4111. Similarly, when receiving data, antenna 4111 may collect radio signals which are then converted into digital data by radio front end circuitry 4112. The digital data may be passed to processing circuitry 4120. In other embodiments, the interface may comprise different components and/or different combinations of components.

Processing circuitry 4120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 4110 components, such as device readable medium 4130, WD 4110 functionality. Such functionality may include providing any of the various wireless features or benefits discussed herein. For example, processing circuitry 4120 may execute instructions stored in device readable medium 4130 or in memory within processing circuitry 4120 to provide the functionality disclosed herein.

As illustrated, processing circuitry 4120 includes one or more of RF transceiver circuitry 4122, baseband processing circuitry 4124, and application processing circuitry 4126. In other embodiments, the processing circuitry may comprise different components and/or different combinations of components. In certain embodiments processing circuitry 4120 of WD 4110 may comprise a SOC. In some embodiments, RF transceiver circuitry 4122, baseband processing circuitry 4124, and application processing circuitry 4126 may be on separate chips or sets of chips. In alternative embodiments, part or all of baseband processing circuitry 4124 and application processing circuitry 4126 may be combined into one chip or set of chips, and RF transceiver circuitry 4122 may be on a separate chip or set of chips. In still alternative embodiments, part or all of RF transceiver circuitry 4122 and baseband processing circuitry 4124 may be on the same chip or set of chips, and application processing circuitry 4126 may be on a separate chip or set of chips. In yet other alternative embodiments, part or all of RF transceiver circuitry 4122, baseband processing circuitry 4124, and application processing circuitry 4126 may be combined in the same chip or set of chips. In some embodiments, RF transceiver circuitry 4122 may be a part of interface 4114. RF transceiver circuitry 4122 may condition RF signals for processing circuitry 4120.

In certain embodiments, some or all of the functionality described herein as being performed by a WD may be provided by processing circuitry 4120 executing instructions stored on device readable medium 4130, which in certain embodiments may be a computer-readable storage medium. In alternative embodiments, some or all of the functionality may be provided by processing circuitry 4120 without executing instructions stored on a separate or discrete device readable storage medium, such as in a hard-wired manner In any of those particular embodiments, whether executing instructions stored on a device readable storage medium or not, processing circuitry 4120 can be configured to perform the described functionality. The benefits provided by such functionality are not limited to processing circuitry 4120 alone or to other components of WD 4110, but are enjoyed by WD 4110 as a whole, and/or by end users and the wireless network generally.

Processing circuitry 4120 may be configured to perform any determining, calculating, or similar operations (e.g., certain obtaining operations) described herein as being performed by a WD. These operations, as performed by processing circuitry 4120, may include processing information obtained by processing circuitry 4120 by, for example, converting the obtained information into other information, comparing the obtained information or converted information to information stored by WD 4110, and/or performing one or more operations based on the obtained information or converted information, and as a result of said processing making a determination.

Device readable medium 4130 may be operable to store a computer program, software, an application including one or more of logic, rules, code, tables, etc. and/or other instructions capable of being executed by processing circuitry 4120. Device readable medium 4130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 4120. In some embodiments, processing circuitry 4120 and device readable medium 4130 may be considered to be integrated.

User interface equipment 4132 may provide components that allow for a human user to interact with WD 4110. Such interaction may be of many forms, such as visual, audial, tactile, etc. User interface equipment 4132 may be operable to produce output to the user and to allow the user to provide input to WD 4110. The type of interaction may vary depending on the type of user interface equipment 4132 installed in WD 4110. For example, if WD 4110 is a smart phone, the interaction may be via a touch screen; if WD 4110 is a smart meter, the interaction may be through a screen that provides usage (e.g., the number of gallons used) or a speaker that provides an audible alert (e.g., if smoke is detected). User interface equipment 4132 may include input interfaces, devices and circuits, and output interfaces, devices and circuits. User interface equipment 4132 is configured to allow input of information into WD 4110, and is connected to processing circuitry 4120 to allow processing circuitry 4120 to process the input information. User interface equipment 4132 may include, for example, a microphone, a proximity or other sensor, keys/buttons, a touch display, one or more cameras, a USB port, or other input circuitry. User interface equipment 4132 is also configured to allow output of information from WD 4110, and to allow processing circuitry 4120 to output information from WD 4110. User interface equipment 4132 may include, for example, a speaker, a display, vibrating circuitry, a USB port, a headphone interface, or other output circuitry. Using one or more input and output interfaces, devices, and circuits, of user interface equipment 4132, WD 4110 may communicate with end users and/or the wireless network, and allow them to benefit from the functionality described herein.

Auxiliary equipment 4134 is operable to provide more specific functionality which may not be generally performed by WDs. This may comprise specialized sensors for doing measurements for various purposes, interfaces for additional types of communication such as wired communications etc. The inclusion and type of components of auxiliary equipment 4134 may vary depending on the embodiment and/or scenario.

Power source 4136 may, in some embodiments, be in the form of a battery or battery pack. Other types of power sources, such as an external power source (e.g., an electricity outlet), photovoltaic devices or power cells, may also be used. WD 4110 may further comprise power circuitry 4137 for delivering power from power source 4136 to the various parts of WD 4110 which need power from power source 4136 to carry out any functionality described or indicated herein. Power circuitry 4137 may in certain embodiments comprise power management circuitry. Power circuitry 4137 may additionally or alternatively be operable to receive power from an external power source; in which case WD 4110 may be connectable to the external power source (such as an electricity outlet) via input circuitry or an interface such as an electrical power cable. Power circuitry 4137 may also in certain embodiments be operable to deliver power from an external power source to power source 4136. This may be, for example, for the charging of power source 4136. Power circuitry 4137 may perform any formatting, converting, or other modification to the power from power source 4136 to make the power suitable for the respective components of WD 4110 to which power is supplied.

Figure 13:
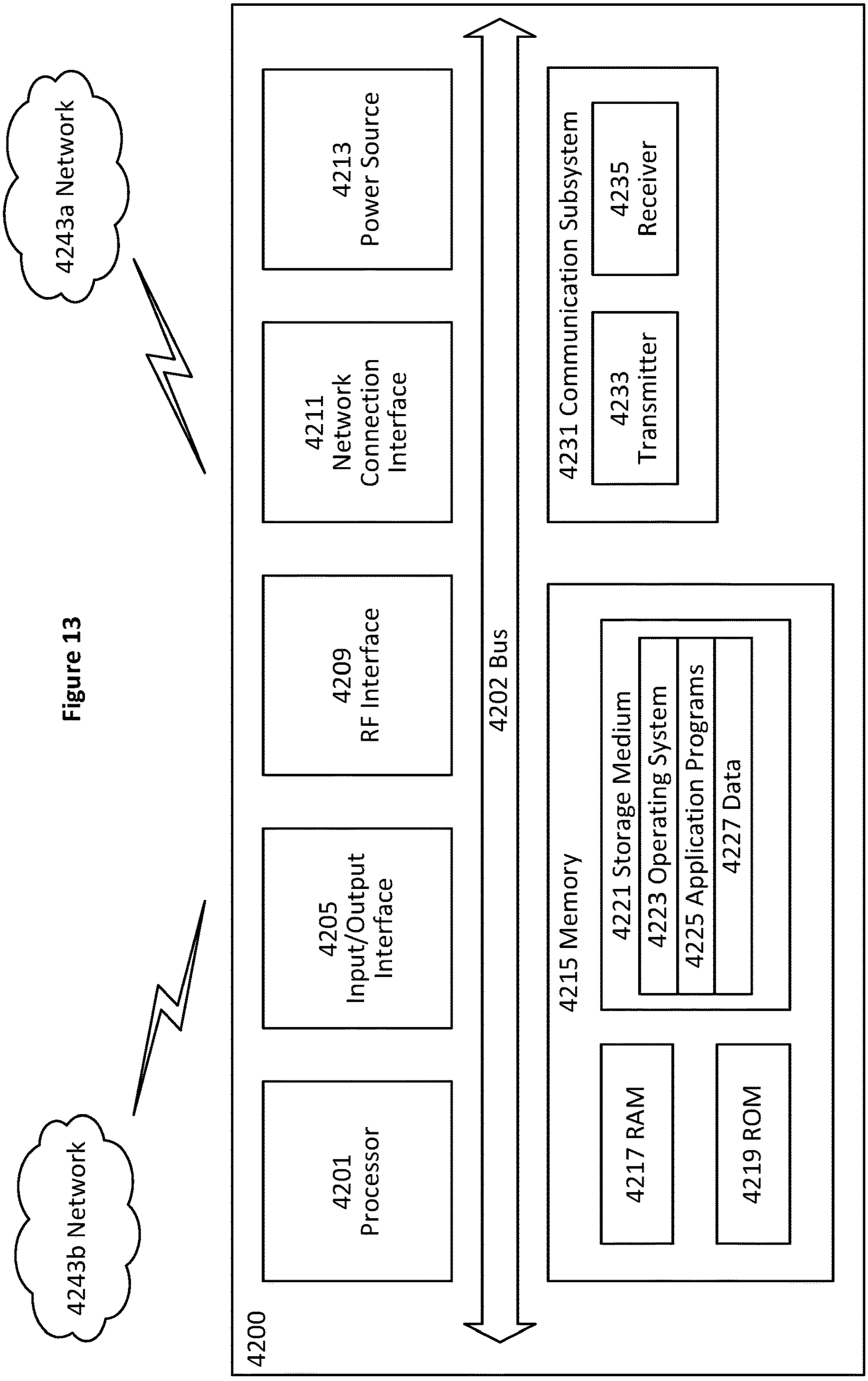
FIG. 13 is a block diagram of a user equipment in accordance with some embodiments

FIG. 13 illustrates a user Equipment in accordance with some embodiments.

FIG. 13 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 42200 may be any UE identified by the 3rd Generation Partnership Project (3GPP), including a NB-IoT UE, a machine type communication (MTC) UE, and/or an enhanced MTC (eMTC) UE. UE 4200, as illustrated in FIG. 13, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 13 is a UE, the components discussed herein are equally applicable to a WD, and vice-versa.

In FIG. 13, UE 4200 includes processing circuitry 4201 that is operatively coupled to input/output interface 4205, radio frequency (RF) interface 4209, network connection interface 4211, memory 4215 including random access memory (RAM) 4217, read-only memory (ROM) 4219, and storage medium 4221 or the like, communication subsystem 4231, power source 4213, and/or any other component, or any combination thereof. Storage medium 4221 includes operating system 4223, application program 4225, and data 4227. In other embodiments, storage medium 4221 may include other similar types of information. Certain UEs may utilize all of the components shown in FIG. 13, or only a subset of the components. The level of integration between the components may vary from one UE to another UE. Further, certain UEs may contain multiple instances of a component, such as multiple processors, memories, transceivers, transmitters, receivers, etc.

In FIG. 13, processing circuitry 4201 may be configured to process computer instructions and data. Processing circuitry 4201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 4201 may include two central processing units (CPUs). Data may be information in a form suitable for use by a computer.

In the depicted embodiment, input/output interface 4205 may be configured to provide a communication interface to an input device, output device, or input and output device. UE 4200 may be configured to use an output device via input/output interface 4205. An output device may use the same type of interface port as an input device. For example, a USB port may be used to provide input to and output from UE 4200. The output device may be a speaker, a sound card, a video card, a display, a monitor, a printer, an actuator, an emitter, a smartcard, another output device, or any combination thereof. UE 4200 may be configured to use an input device via input/output interface 4205 to allow a user to capture information into UE 4200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 13, RF interface 4209 may be configured to provide a communication interface to RF components such as a transmitter, a receiver, and an antenna. Network connection interface 4211 may be configured to provide a communication interface to network 4243*a*. Network 4243*a* may encompass wired and/or wireless networks such as a local-area network (LAN), a wide-area network (WAN), a computer network, a wireless network, a telecommunications network, another like network or any combination thereof. For example, network 4243*a* may comprise a Wi-Fi network. Network connection interface 4211 may be configured to include a receiver and a transmitter interface used to communicate with one or more other devices over a communication network according to one or more communication protocols, such as Ethernet, TCP/IP, SONET, ATM, or the like. Network connection interface 4211 may implement receiver and transmitter functionality appropriate to the communication network links (e.g., optical, electrical, and the like). The transmitter and receiver functions may share circuit components, software or firmware, or alternatively may be implemented separately.

RAM 4217 may be configured to interface via bus 4202 to processing circuitry 4201 to provide storage or caching of data or computer instructions during the execution of software programs such as the operating system, application programs, and device drivers. ROM 4219 may be configured to provide computer instructions or data to processing circuitry 4201. For example, ROM 4219 may be configured to store invariant low-level system code or data for basic system functions such as basic input and output (I/O), startup, or reception of keystrokes from a keyboard that are stored in a non-volatile memory. Storage medium 4221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 4221 may be configured to include operating system 4223, application program 4225 such as a web browser application, a widget or gadget engine or another application, and data file 4227. Storage medium 4221 may store, for use by UE 4200, any of a variety of various operating systems or combinations of operating systems.

Storage medium 4221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 4221 may allow UE 4200 to access computer-executable instructions, application programs or the like, stored on transitory or non-transitory memory media, to off-load data, or to upload data. An article of manufacture, such as one utilizing a communication system may be tangibly embodied in storage medium 4221, which may comprise a device readable medium.

In FIG. 13, processing circuitry 4201 may be configured to communicate with network 4243*b* using communication subsystem 4231. Network 4243*a* and network 4243*b* may be the same network or networks or different network or networks. Communication subsystem 4231 may be configured to include one or more transceivers used to communicate with network 4243*b*. For example, communication subsystem 4231 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 4233 and/or receiver 4235 to implement transmitter or receiver functionality, respectively, appropriate to the RAN links (e.g., frequency allocations and the like). Further, transmitter 4233 and receiver 4235 of each transceiver may share circuit components, software or firmware, or alternatively may be implemented separately.

In the illustrated embodiment, the communication functions of communication subsystem 4231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 4231 may include cellular communication, Wi-Fi communication, Bluetooth communication, and GPS communication. Network 4243*b* may encompass wired and/or wireless networks such as a local-area network (LAN), a wide-area network (WAN), a computer network, a wireless network, a telecommunications network, another like network or any combination thereof. For example, network 4243*b* may be a cellular network, a Wi-Fi network, and/or a near-field network. Power source 4213 may be configured to provide alternating current (AC) or direct current (DC) power to components of UE 4200.

The features, benefits and/or functions described herein may be implemented in one of the components of UE 4200 or partitioned across multiple components of UE 4200. Further, the features, benefits, and/or functions described herein may be implemented in any combination of hardware, software or firmware. In one example, communication subsystem 4231 may be configured to include any of the components described herein. Further, processing circuitry 4201 may be configured to communicate with any of such components over bus 4202. In another example, any of such components may be represented by program instructions stored in memory that when executed by processing circuitry 4201 perform the corresponding functions described herein. In another example, the functionality of any of such components may be partitioned between processing circuitry 4201 and communication subsystem 4231. In another example, the non-computationally intensive functions of any of such components may be implemented in software or firmware and the computationally intensive functions may be implemented in hardware.

Figure 14:
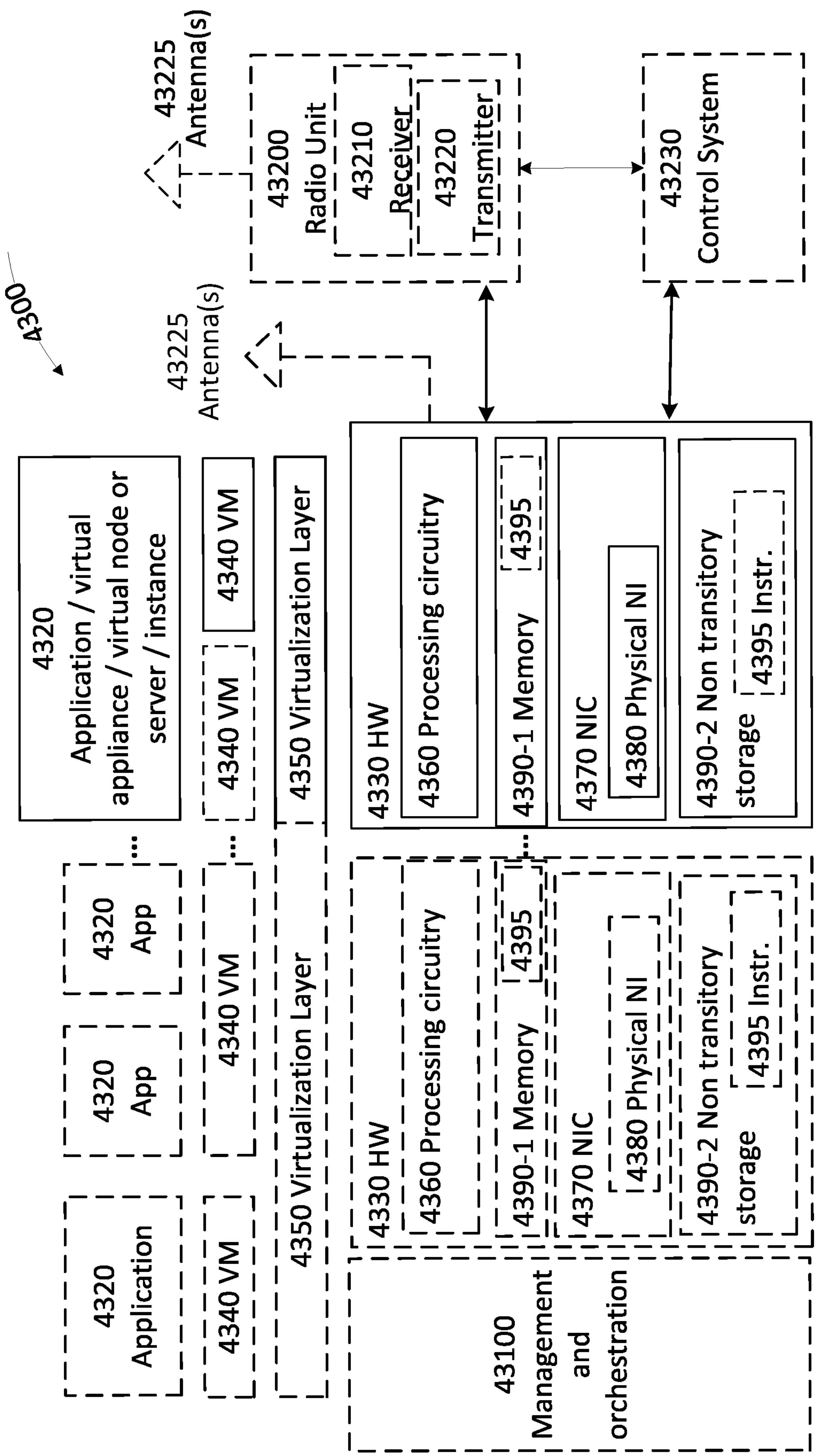
FIG. 14 is a block diagram of a virtualization environment in accordance with some embodiments.

FIG. 14 illustrates a virtualization environment in accordance with some embodiments.

FIG. 14 is a schematic block diagram illustrating a virtualization environment 4300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 4300 hosted by one or more of hardware nodes 4330. Further, in embodiments in which the virtual node is not a radio access node or does not require radio connectivity (e.g., a core network node), then the network node may be entirely virtualized.

The functions may be implemented by one or more applications 4320 (which may alternatively be called software instances, virtual appliances, network functions, virtual nodes, virtual network functions, etc.) operative to implement some of the features, functions, and/or benefits of some of the embodiments disclosed herein. Applications 4320 are run in virtualization environment 4300 which provides hardware 4330 comprising processing circuitry 4360 and memory 4390. Memory 4390 contains instructions 4395 executable by processing circuitry 4360 whereby application 4320 is operative to provide one or more of the features, benefits, and/or functions disclosed herein.

Virtualization environment 4300, comprises general-purpose or special-purpose network hardware devices 4330 comprising a set of one or more processors or processing circuitry 4360, which may be commercial off-the-shelf (COTS) processors, dedicated Application Specific Integrated Circuits (ASICs), or any other type of processing circuitry including digital or analog hardware components or special purpose processors. Each hardware device may comprise memory 4390-1 which may be non-persistent memory for temporarily storing instructions 4395 or software executed by processing circuitry 4360. Each hardware device may comprise one or more network interface controllers (NICs) 4370, also known as network interface cards, which include physical network interface 4380. Each hardware device may also include non-transitory, persistent, machine-readable storage media 4390-2 having stored therein software 4395 and/or instructions executable by processing circuitry 4360. Software 4395 may include any type of software including software for instantiating one or more virtualization layers 4350 (also referred to as hypervisors), software to execute virtual machines 4340 as well as software allowing it to execute functions, features and/or benefits described in relation with some embodiments described herein.

Virtual machines 4340 comprise virtual processing, virtual memory, virtual networking or interface and virtual storage, and may be run by a corresponding virtualization layer 4350 or hypervisor. Different embodiments of the instance of virtual appliance 4320 may be implemented on one or more of virtual machines 4340, and the implementations may be made in different ways.

During operation, processing circuitry 4360 executes software 4395 to instantiate the hypervisor or virtualization layer 4350, which may sometimes be referred to as a virtual machine monitor (VMM). Virtualization layer 4350 may present a virtual operating platform that appears like networking hardware to virtual machine 4340.

As shown in FIG. 14, hardware 4330 may be a standalone network node with generic or specific components. Hardware 4330 may comprise antenna 43225 and may implement some functions via virtualization. Alternatively, hardware 4330 may be part of a larger cluster of hardware (e.g. such as in a data center or customer premise equipment (CPE)) where many hardware nodes work together and are managed via management and orchestration (MANO) 43100, which, among others, oversees lifecycle management of applications 4320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 4340 may be a software implementation of a physical machine that runs programs as if they were executing on a physical, non-virtualized machine. Each of virtual machines 4340, and that part of hardware 4330 that executes that virtual machine, be it hardware dedicated to that virtual machine and/or hardware shared by that virtual machine with others of the virtual machines 4340, forms a separate virtual network elements (VNE).

Still in the context of NFV, Virtual Network Function (VNF) is responsible for handling specific network functions that run in one or more virtual machines 4340 on top of hardware networking infrastructure 4330 and corresponds to application 4320 in FIG. 14.

In some embodiments, one or more radio units 43200 that each include one or more transmitters 43220 and one or more receivers 43210 may be coupled to one or more antennas 43225. Radio units 43200 may communicate directly with hardware nodes 4330 via one or more appropriate network interfaces and may be used in combination with the virtual components to provide a virtual node with radio capabilities, such as a radio access node or a base station.

In some embodiments, some signalling can be effected with the use of control system 43230 which may alternatively be used for communication between the hardware nodes 4330 and radio units 43200.

Figure 15:
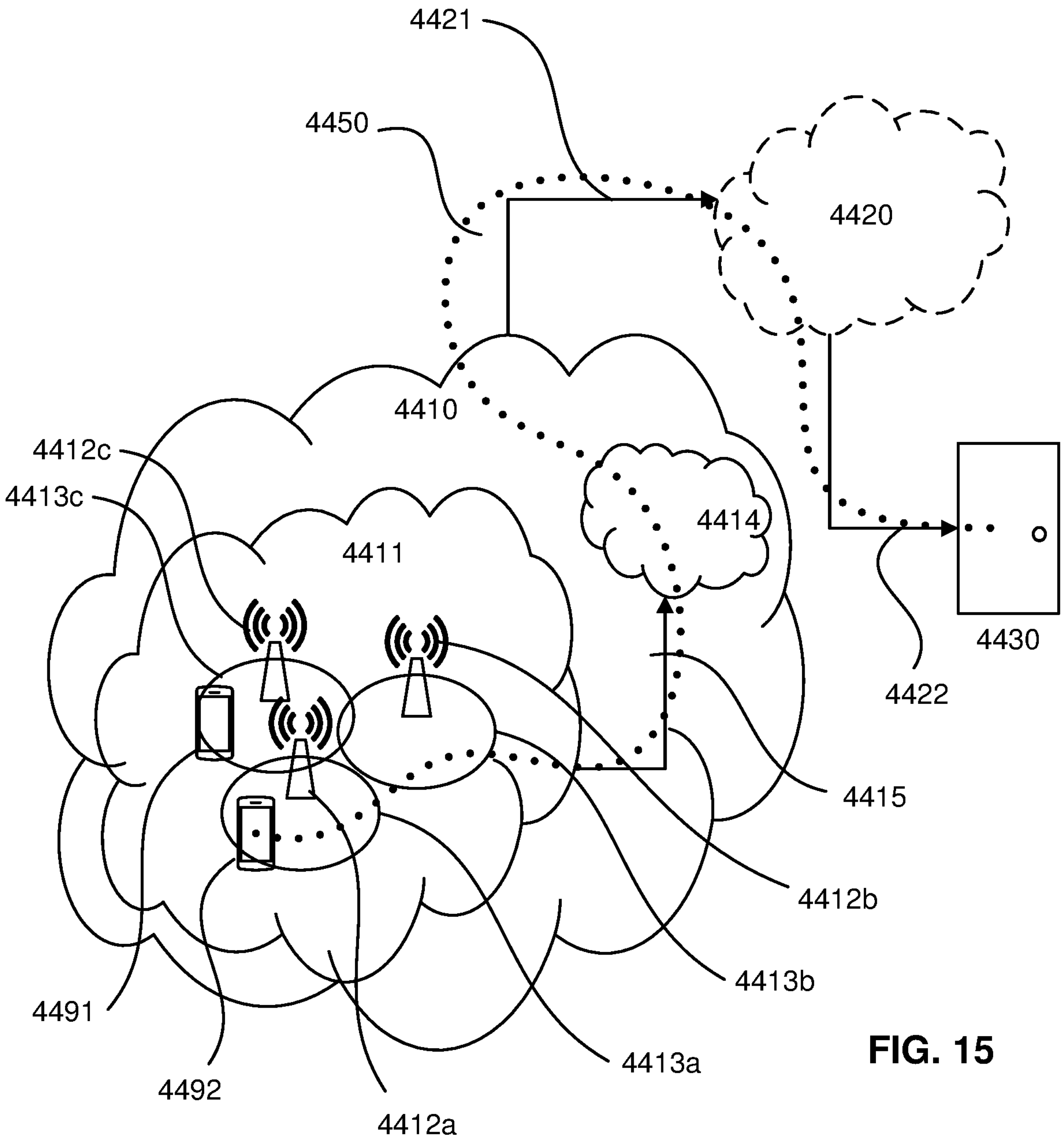
FIG. 15 is a block diagram of a telecommunication network connected via an intermediate network to a host computer in accordance with some embodiments.

FIG. 15 illustrates a telecommunication network connected via an intermediate network to a host computer in accordance with some embodiments.

With reference to FIG. 15, in accordance with an embodiment, a communication system includes telecommunication network 4410, such as a 3GPP-type cellular network, which comprises access network 4411, such as a radio access network, and core network 4414. Access network 4411 comprises a plurality of base stations 4412*a*, 4412*b*, 4412*c*, such as NBs, eNBs, gNBs or other types of wireless access points, each defining a corresponding coverage area 4413*a*, 4413*b*, 4413*c*. Each base station 4412*a*, 4412*b*, 4412*c* is connectable to core network 4414 over a wired or wireless connection 4415. A first UE 4491 located in coverage area 4413*c* is configured to wirelessly connect to, or be paged by, the corresponding base station 4412*c*. A second UE 4492 in coverage area 4413*a* is wirelessly connectable to the corresponding base station 4412*a*. While a plurality of UEs 4491, 4492 are illustrated in this example, the disclosed embodiments are equally applicable to a situation where a sole UE is in the coverage area or where a sole UE is connecting to the corresponding base station 4412.

Telecommunication network 4410 is itself connected to host computer 4430, which may be embodied in the hardware and/or software of a standalone server, a cloud-implemented server, a distributed server or as processing resources in a server farm. Host computer 4430 may be under the ownership or control of a service provider, or may be operated by the service provider or on behalf of the service provider. Connections 4421 and 4422 between telecommunication network 4410 and host computer 4430 may extend directly from core network 4414 to host computer 4430 or may go via an optional intermediate network 4420. Intermediate network 4420 may be one of, or a combination of more than one of, a public, private or hosted network; intermediate network 4420, if any, may be a backbone network or the Internet; in particular, intermediate network 4420 may comprise two or more sub-networks (not shown).

The communication system of FIG. 15 as a whole enables connectivity between the connected UEs 4491, 4492 and host computer 4430. The connectivity may be described as an over-the-top (OTT) connection 4450. Host computer 4430 and the connected UEs 4491, 4492 are configured to communicate data and/or signaling via OTT connection 4450, using access network 4411, core network 4414, any intermediate network 4420 and possible further infrastructure (not shown) as intermediaries. OTT connection 4450 may be transparent in the sense that the participating communication devices through which OTT connection 4450 passes are unaware of routing of uplink and downlink communications. For example, base station 4412 may not or need not be informed about the past routing of an incoming downlink communication with data originating from host computer 4430 to be forwarded (e.g., handed over) to a connected UE 4491. Similarly, base station 4412 need not be aware of the future routing of an outgoing uplink communication originating from the UE 4491 towards the host computer 4430.

Figure 16:
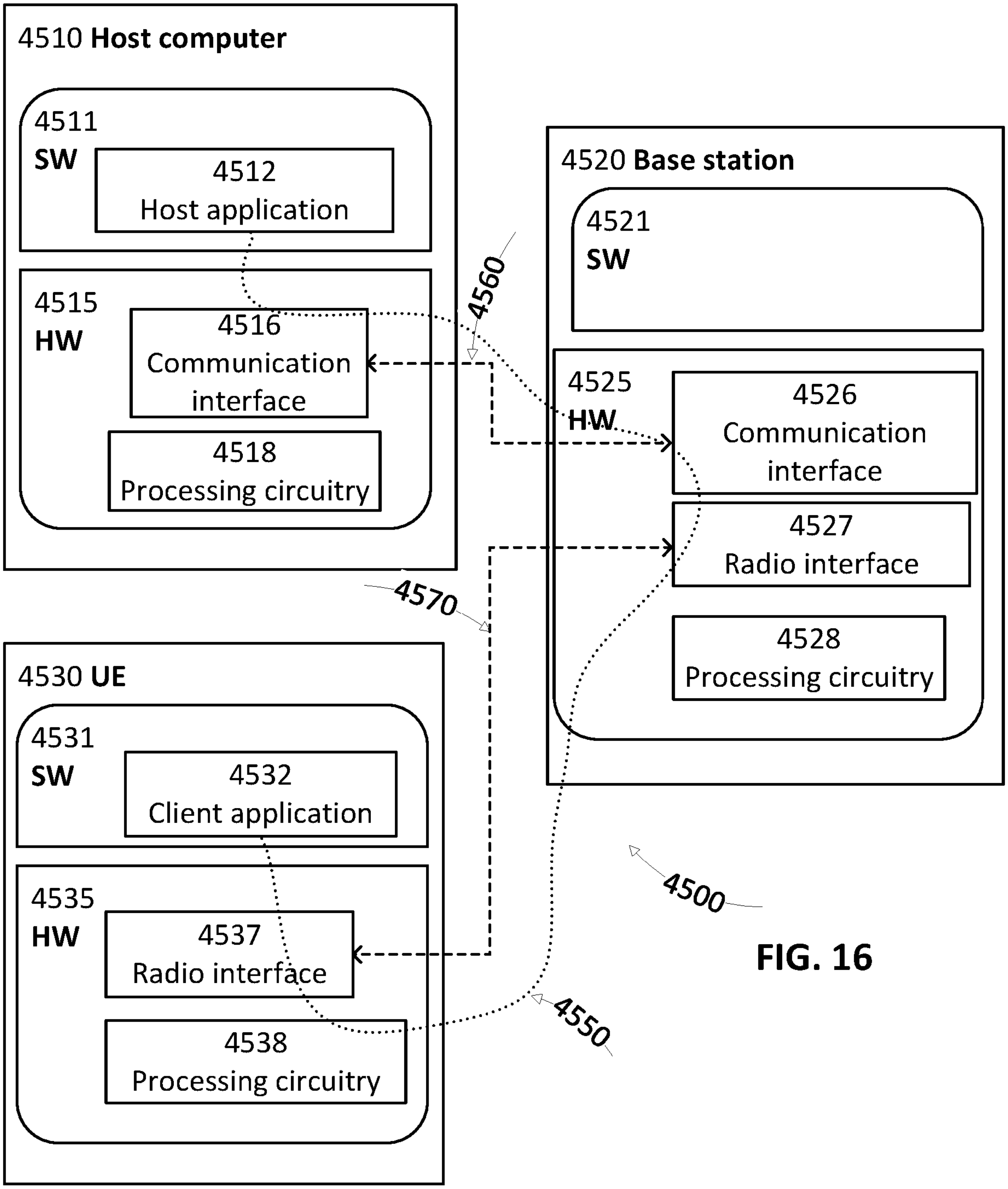
FIG. 16 is a block diagram of a host computer communicating via a base station with a user equipment over a partially wireless connection in accordance with some embodiments.

FIG. 16 illustrates a host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 16. In communication system 4500, host computer 4510 comprises hardware 4515 including communication interface 4516 configured to set up and maintain a wired or wireless connection with an interface of a different communication device of communication system 4500. Host computer 4510 further comprises processing circuitry 4518, which may have storage and/or processing capabilities. In particular, processing circuitry 4518 may comprise one or more programmable processors, application-specific integrated circuits, field programmable gate arrays or combinations of these (not shown) adapted to execute instructions. Host computer 4510 further comprises software 4511, which is stored in or accessible by host computer 4510 and executable by processing circuitry 4518. Software 4511 includes host application 4512. Host application 4512 may be operable to provide a service to a remote user, such as UE 4530 connecting via OTT connection 4550 terminating at UE 4530 and host computer 4510. In providing the service to the remote user, host application 4512 may provide user data which is transmitted using OTT connection 4550.

Communication system 4500 further includes base station 4520 provided in a telecommunication system and comprising hardware 4525 enabling it to communicate with host computer 4510 and with UE 4530. Hardware 4525 may include communication interface 4526 for setting up and maintaining a wired or wireless connection with an interface of a different communication device of communication system 4500, as well as radio interface 4527 for setting up and maintaining at least wireless connection 4570 with UE 4530 located in a coverage area (not shown in FIG. 16) served by base station 4520. Communication interface 4526 may be configured to facilitate connection 4560 to host computer 4510. Connection 4560 may be direct or it may pass through a core network (not shown in FIG. 16) of the telecommunication system and/or through one or more intermediate networks outside the telecommunication system. In the embodiment shown, hardware 4525 of base station 4520 further includes processing circuitry 4528, which may comprise one or more programmable processors, application-specific integrated circuits, field programmable gate arrays or combinations of these (not shown) adapted to execute instructions. Base station 4520 further has software 4521 stored internally or accessible via an external connection.

Communication system 4500 further includes UE 4530 already referred to. Its hardware 4535 may include radio interface 4537 configured to set up and maintain wireless connection 4570 with a base station serving a coverage area in which UE 4530 is currently located. Hardware 4535 of UE 4530 further includes processing circuitry 4538, which may comprise one or more programmable processors, application-specific integrated circuits, field programmable gate arrays or combinations of these (not shown) adapted to execute instructions. UE 4530 further comprises software 4531, which is stored in or accessible by UE 4530 and executable by processing circuitry 4538. Software 4531 includes client application 4532. Client application 4532 may be operable to provide a service to a human or non-human user via UE 4530, with the support of host computer 4510. In host computer 4510, an executing host application 4512 may communicate with the executing client application 4532 via OTT connection 4550 terminating at UE 4530 and host computer 4510. In providing the service to the user, client application 4532 may receive request data from host application 4512 and provide user data in response to the request data. OTT connection 4550 may transfer both the request data and the user data. Client application 4532 may interact with the user to generate the user data that it provides.

It is noted that host computer 4510, base station 4520 and UE 4530 illustrated in FIG. 16 may be similar or identical to host computer 4430, one of base stations 4412*a*, 4412*b*, 4412*c* and one of UEs 4491, 4492 of FIG. 15, respectively. This is to say, the inner workings of these entities may be as shown in FIG. 16 and independently, the surrounding network topology may be that of FIG. 15.

In FIG. 16, OTT connection 4550 has been drawn abstractly to illustrate the communication between host computer 4510 and UE 4530 via base station 4520, without explicit reference to any intermediary devices and the precise routing of messages via these devices. Network infrastructure may determine the routing, which it may be configured to hide from UE 4530 or from the service provider operating host computer 4510, or both. While OTT connection 4550 is active, the network infrastructure may further take decisions by which it dynamically changes the routing (e.g., on the basis of load balancing consideration or reconfiguration of the network).

Wireless connection 4570 between UE 4530 and base station 4520 is in accordance with the teachings of the embodiments described throughout this disclosure. One or more of the various embodiments may improve the performance of OTT services provided to UE 4530 using OTT connection 4550, in which wireless connection 4570 forms the last segment. More precisely, the teachings of these embodiments may improve the random access speed and/or reduce random access failure rates and thereby provide benefits such as faster and/or more reliable random access.

A measurement procedure may be provided for the purpose of monitoring data rate, latency and other factors on which the one or more embodiments improve. There may further be an optional network functionality for reconfiguring OTT connection 4550 between host computer 4510 and UE 4530, in response to variations in the measurement results. The measurement procedure and/or the network functionality for reconfiguring OTT connection 4550 may be implemented in software 4511 and hardware 4515 of host computer 4510 or in software 4531 and hardware 4535 of UE 4530, or both. In embodiments, sensors (not shown) may be deployed in or in association with communication devices through which OTT connection 4550 passes; the sensors may participate in the measurement procedure by supplying values of the monitored quantities exemplified above, or supplying values of other physical quantities from which software 4511, 4531 may compute or estimate the monitored quantities. The reconfiguring of OTT connection 4550 may include message format, retransmission settings, preferred routing etc.; the reconfiguring need not affect base station 4520, and it may be unknown or imperceptible to base station 4520. Such procedures and functionalities may be known and practiced in the art. In certain embodiments, measurements may involve proprietary UE signaling facilitating host computer 4510's measurements of throughput, propagation times, latency and the like. The measurements may be implemented in that software 4511 and 4531 causes messages to be transmitted, in particular empty or 'dummy' messages, using OTT connection 4550 while it monitors propagation times, errors etc.

Figure 17:
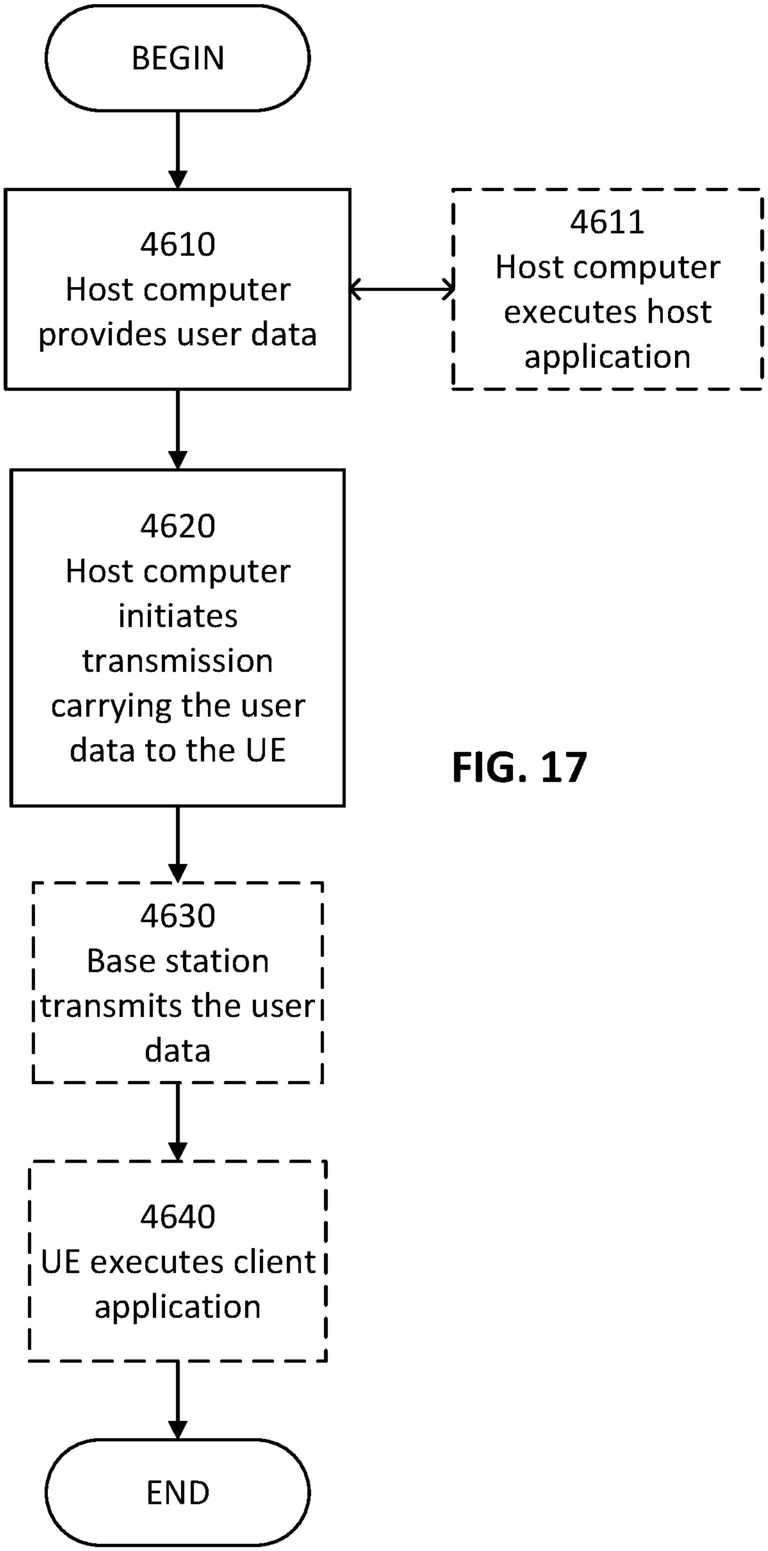
FIG. 17 is a block diagram of methods implemented in a communication system including a host computer, a base station and a user equipment in accordance with some embodiments.

FIG. 17 illustrates methods implemented in a communication system including a host computer, a base station and a user equipment in accordance with some embodiments.

FIG. 17 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 17 will be included in this section. In step 4610, the host computer provides user data. In substep 4611 (which may be optional) of step 4610, the host computer provides the user data by executing a host application. In step 4620, the host computer initiates a transmission carrying the user data to the UE. In step 4630 (which may be optional), the base station transmits to the UE the user data which was carried in the transmission that the host computer initiated, in accordance with the teachings of the embodiments described throughout this disclosure. In step 4640 (which may also be optional), the UE executes a client application associated with the host application executed by the host computer.

Figure 18:
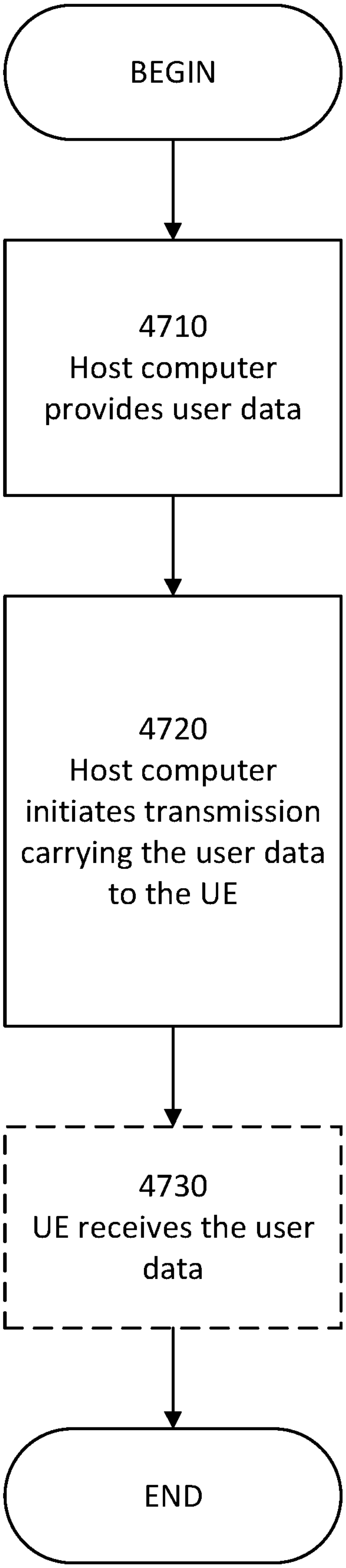
FIG. 18 is a block diagram of methods implemented in a communication system including a host computer, a base station and a user equipment in accordance with some embodiments.

FIG. 18 illustrates methods implemented in a communication system including a host computer, a base station and a user equipment in accordance with some embodiments.

FIG. 18 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 18 will be included in this section. In step 4710 of the method, the host computer provides user data. In an optional substep (not shown) the host computer provides the user data by executing a host application. In step 4720, the host computer initiates a transmission carrying the user data to the UE. The transmission may pass via the base station, in accordance with the teachings of the embodiments described throughout this disclosure. In step 4730 (which may be optional), the UE receives the user data carried in the transmission.

Figure 19:
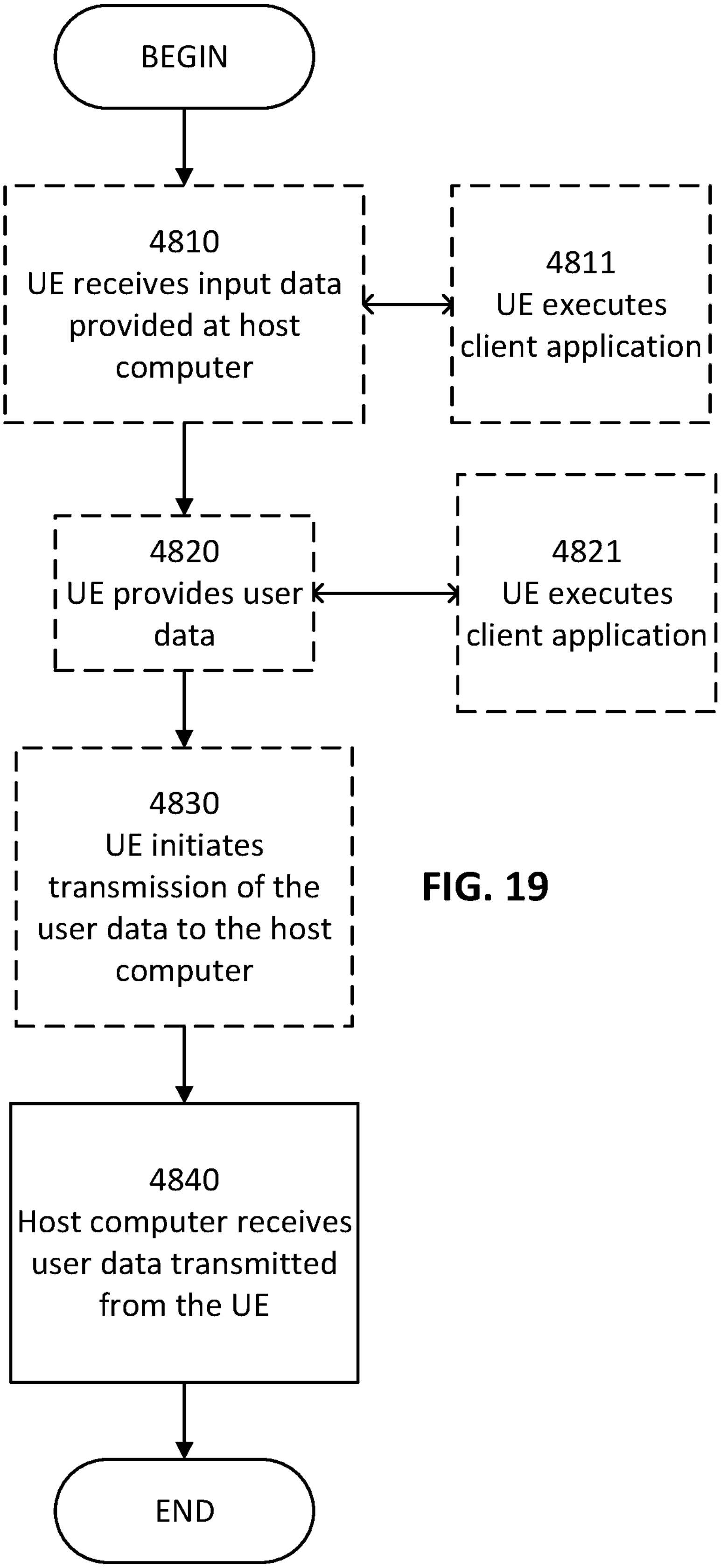
FIG. 19 is a block diagram of methods implemented in a communication system including a host computer, a base station and a user equipment in accordance with some embodiments.

FIG. 19 illustrates methods implemented in a communication system including a host computer, a base station and a user equipment in accordance with some embodiments FIG. 19 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 19 will be included in this section. In step 4810 (which may be optional), the UE receives input data provided by the host computer. Additionally or alternatively, in step 4820, the UE provides user data. In substep 4821 (which may be optional) of step 4820, the UE provides the user data by executing a client application. In substep 4811 (which may be optional) of step 4810, the UE executes a client application which provides the user data in reaction to the received input data provided by the host computer. In providing the user data, the executed client application may further consider user input received from the user. Regardless of the specific manner in which the user data was provided, the UE initiates, in substep 4830 (which may be optional), transmission of the user data to the host computer. In step 4840 of the method, the host computer receives the user data transmitted from the UE, in accordance with the teachings of the embodiments described throughout this disclosure.

Figure 20:
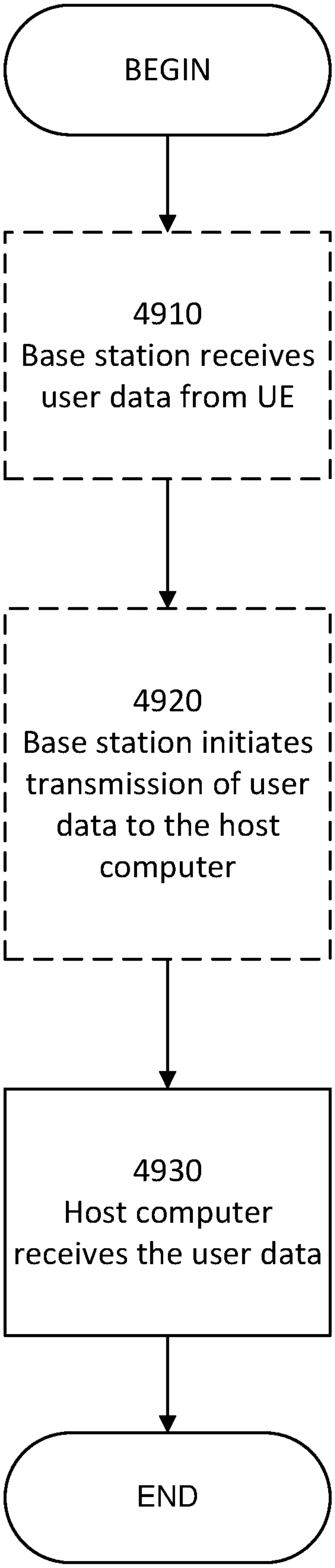
FIG. 20 is a block diagram of methods implemented in a communication system including a host computer, a base station and a user equipment in accordance with some embodiments.

FIG. 20 illustrates methods implemented in a communication system including a host computer, a base station and a user equipment in accordance with some embodiments FIG. 20 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 20 will be included in this section. In step 4910 (which may be optional), in accordance with the teachings of the embodiments described throughout this disclosure, the base station receives user data from the UE. In step 4920 (which may be optional), the base station initiates transmission of the received user data to the host computer. In step 4930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Abbreviations

At least some of the following abbreviations may be used in this disclosure. If there is an inconsistency between abbreviations, preference should be given to how it is used above. If listed multiple times below, the first listing should be preferred over any subsequent listing(s).

1×RTT CDMA2000 1× Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being “connected”, “coupled”, “responsive”, or variants thereof to another element, it can be directly connected, coupled, or responsive to the other element or intervening elements may be present. In contrast, when an element is referred to as being “directly connected”, “directly coupled”, “directly responsive”, or variants thereof to another element, there are no intervening elements present. Like numbers refer to like elements throughout. Furthermore, “coupled”, “connected”, “responsive”, or variants thereof as used herein may include wirelessly coupled, connected, or responsive. As used herein, the singular forms “a”, “an” and “the” are intended to include the plural forms as well, unless the context clearly indicates otherwise. Well-known functions or constructions may not be described in detail for brevity and/or clarity. The term “and/or” (abbreviated “/”) includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms “comprise”, “comprising”, “comprises”, “include”, “including”, “includes”, “have”, “has”, “having”, or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation “e.g.”, which derives from the Latin phrase “exempli gratia,” may be used to introduce or specify a general example or examples of a previously mentioned item, and is not intended to be limiting of such item. The common abbreviation “i.e.”, which derives from the Latin phrase “id est,” may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, micro-code, etc.) that runs on a processor such as a digital signal processor, which may collectively be referred to as “circuitry,” “a module” or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

The invention claimed is:

1. A method of operating a network function, NF, node of a communication network, the method comprising:

transmitting an association service request message to an access and mobility management function, AMF, node, wherein the association service request message includes an identifier of a communication device;

receiving an association service response message from the AMF node after transmitting the association service request message, wherein the association service response message includes information regarding a radio access network, RAN, node with which a communication device is connected; and providing communication between the NF node and the RAN node with which the communication device is connected using the information regarding the RAN node.

2. The method of claim 1, wherein the information regarding the RAN node comprises information regarding the RAN node with which the communication device is connected.

3. The method of claim 2, wherein the information regarding the RAN node comprises an identifier of the RAN node with which the communication device is connected.

4. The method of claim 3, wherein the identifier of the RAN node includes a portion of at least one of a uniform resource location, URL, of the RAN node, an Internet Protocol, IP, address of the RAN node, and/or a gNB identifier of the RAN node.

5. The method of claim 1, wherein the association service request message further includes at least one of a temporary identifier for the communication device, a temporary context identifier for the communication device, and/or a Subscription Permanent Identifier, SUPI, of the communication device.

6. The method of claim 1, wherein the association service response message includes the identifier of the communication device, and/or wherein the association service request message includes a request identifier and the association service response message includes the request identifier.

7. The method of claim 1, wherein the identifier of the communication device comprises a portion of at least one of Subscription Permanent Identifier, SUPI, of the communication device, a Subscription Concealed Identifier, SUCI, of the communication device, an International Mobile Subscriber Identifier, IMSI, of the communication device, a System Architecture Evolution Temporary Mobile Subscriber Identifier, S-TMSI, of the communication device, a context identifier of the communication device, and/or a group identifier for a plurality of communication devices in a group.

8. The method of claim 1, wherein the RAN node is a first RAN node with which the communication device is connected, the method further comprising:

transmitting a subscription request message to the AMF node; after transmitting the subscription request message, receiving an association notification update message from the AMF node, wherein the association notification update message includes information regarding a second RAN node with which the communication device is connected.

9. The method of claim 8, wherein transmitting the subscription request message comprises transmitting the subscription request message as an indication included in the association service request message.

10. The method of claim 8, wherein the subscription request message is transmitted after receiving the association service response message, and wherein the subscription request message includes the identifier of the communication device.

11. The method of claim 1, wherein the information regarding the RAN node comprises an indication that no radio access network, RAN, node information is available for the communication device from the AMF node.

12. The method of claim 11, wherein the AMF node is a source AMF node, and wherein the information regarding the RAN node comprises the indication that no RAN node information is available for the communication device from the source AMF node.

13. The method of claim 11, wherein the message further includes at least one of a temporary identifier for the communication device, a temporary context identifier for the communication device, and/or a Subscription Permanent Identifier, SUPI, of the communication device.

14. The method of claim 11, wherein the message comprises an association service response message, the method further comprising:

transmitting an association service request message to the AMF node, wherein the association service request message includes an identifier of the communication device; wherein the association service response message is received after transmitting the association service request message.

15. The method of claim 14, wherein the association service response message includes the identifier of the of the communication device, and/or wherein the association service request message includes a request identifier and the association service response message includes the request identifier.

16. The method of claim 14, wherein the identifier of the communication device comprises a portion of at least one of Subscription Permanent Identifier, SUPI, of the communication device, a Subscription Concealed Identifier, SUCI, of the communication device, an International Mobile Subscriber Identifier, IMSI, of the communication device, a System Architecture Evolution Temporary Mobile Subscriber Identifier, S-TMSI, of the communication device, a context identifier of the communication device, and/or a group identifier for a plurality of communication devices in a group.

17. The method of claim 1, wherein providing communication between the NF node and the RAN node comprises communicating between the NF node and the RAN node without going through the AMF node.

18. The method of claim 1, wherein the NF node comprises a Session Management Function, SMF, node, and wherein providing communication between the NF node and the RAN node comprises providing session management information between the SMF node and the RAN node using the information regarding the RAN node.

19. A network function, NF, node comprising:

processing circuitry; and memory coupled with the processing circuitry, wherein the memory includes instructions that when executed by the processing circuitry causes the NF node to, transmit an association service request message to an access and mobility management function, AMF, node, wherein the association service request message includes an identifier of a communication device;

receive an association service response message from the AMF node after transmitting the association service request message, wherein the association service response message includes information regarding a radio access network, RAN, node with which a communication device is connected; and provide communication between the NF node and the RAN node with which the communication device is connected using the information regarding the RAN node.

* * * * *